(12) United States Patent
Liao et al.

(10) Patent No.: US 10,523,146 B2
(45) Date of Patent: Dec. 31, 2019

(54) OFF-GRID POWER GENERATING APPARATUS AND FREQUENCY AND VOLTAGE CONTROL METHOD THEREOF

(71) Applicant: Chongqing HEYA Technology Co., Ltd., Chongqing (CN)

(72) Inventors: Yong Liao, Chongqing (CN); Huaping Tang, Chongqing (CN); Weijia Zhang, Chongqing (CN); Meichang Xie, Chongqing (CN)

(73) Assignee: CHONGQING HEYA TECHNOLOGY CO., LTD., Chongqing (CN)

( * ) Notice: Subject to any disclaimer, the term of this patent is extended or adjusted under 35 U.S.C. 154(b) by 22 days.

(21) Appl. No.: 16/003,750

(22) Filed: Jun. 8, 2018

(65) Prior Publication Data
US 2019/0229656 A1    Jul. 25, 2019

(30) Foreign Application Priority Data
Jan. 25, 2018   (CN) .......................... 2018 1 0073126

(51) Int. Cl.
| | |
|---|---|
| *H02P 9/30* | (2006.01) |
| *H02K 11/26* | (2016.01) |
| *H02K 11/27* | (2016.01) |
| *H02K 11/33* | (2016.01) |
| *H02K 7/18* | (2006.01) |
| *H02K 17/44* | (2006.01) |
| *H02K 11/21* | (2016.01) |
| *H02M 7/5387* | (2007.01) |

(52) U.S. Cl.
CPC .......... *H02P 9/305* (2013.01); *H02K 7/1815* (2013.01); *H02K 11/21* (2016.01); *H02K 11/26* (2016.01); *H02K 11/27* (2016.01); *H02K 11/33* (2016.01); *H02K 17/44* (2013.01); *H02M 7/53871* (2013.01)

(58) Field of Classification Search
USPC ......................................... 290/40 A; 322/20
See application file for complete search history.

(56) References Cited

U.S. PATENT DOCUMENTS

| | | | |
|---|---|---|---|
| 2019/0229657 A1* | 7/2019 | Liao | ........................ H02P 9/307 |
| 2019/0229660 A1* | 7/2019 | Liao | ........................ H02P 21/09 |

* cited by examiner

*Primary Examiner* — Pedro J Cuevas
(74) *Attorney, Agent, or Firm* — Hamre, Schumann, Mueller & Larson, P.C.

(57) ABSTRACT

A power generating apparatus is provided. The alternator includes a rotor, a stator, one or more sensors and an electrical circuit. The rotor includes a plurality of symmetric phase windings while the stator has a single phase winding. The excitation control device is configured to control the induced voltage generated in stator by regulating the rotating magnetic field generated in the phase windings of the rotor. The excitation control device is also configured to regulate the engine speed responsive to calculated load power. The electrical circuit connecting the single phase winding of the stator and the load is configured in a way that the induced voltage generated in the single phase winding and the output voltage applied to the load are at the same frequency. This arrangement reduces costs of the apparatus.

20 Claims, 24 Drawing Sheets

OFF-GRID POWER GENERATING APPARATUS AND FREQUENCY AND VOLTAGE CONTROL METHOD THEREOF

RELATED APPLICATION

This application claims priority to Chinese Patent Application No. 201810073126.X, entitled "Off-Grid Power Generating Apparatus and Frequency and Voltage Control Method Thereof" filed on Jan. 25, 2018, which is incorporated by reference in its entirety.

TECHNICAL FIELD

Embodiments disclosed herein relate generally to an electrical power generating apparatus and its control method, and in particular, to an engine-driven and off-grid power generating apparatus and its control method with variable speed and constant frequency.

BACKGROUND

An off-grid generator set is a power generating system whose connection to an electrical power grid is temporarily or permanently unavailable. Off-grid generator sets have been widely used. For example, a portable/standby generator set may be utilized to power electrical equipment connected via a circuit with the generator set when people do camping, tailgating and working outside. A similar power generating apparatus is also utilized to provide backup power in emergencies, for example during blackout.

The off-grid generator set usually utilizes a driving engine coupled to a generator (or alternator) through a common shaft. Upon actuation of the engine, the engine rotates the common shaft to drive the alternator that, in turn, generates electrical power. As it is known, most residential electric equipment is designed to be used in connection with electrical power having a fixed frequency, for example, 60 hertz (Hz) in North America and 50 Hz in China. The frequency of the output electrical power is primarily determined by the operating speed of the engine. As a result, the engine's operating speed of some generator sets is fixed as so to keep the frequency of the output electrical power fixed. However, in situations where an electrical load applied to the generator set is less than the rated kilowatt load for which the generator set is designed, the engine's fuel-efficiency deteriorates. The generator set generates loud noise.

Additionally, the off-grid generator set usually generates an output voltage at a certain level since most electrical loads are designed to work with a voltage at such a level. For example, most household appliances in North America such as ovens, roasters, audio and video displayers use nominal voltages of 120 volts or 240 volts, and most household appliances in China use a nominal voltage of 220 volts.

SUMMARY

Embodiments of off-grid power generating apparatus and its voltage and frequency control method are described. The off-grid power generating apparatus includes a stator with one single phase winding and a rotor with a plurality of symmetric phase windings. This feature of the apparatus helps to make it lighter and cheaper. This apparatus, however, poses a challenge to conventional control strategies for generators. The inventors have contemplated to apply vector control strategies to such an apparatus with a single phase winding on the stator side. However, the vector control strategies are usually used to control three phase generators. Complex functions such as Park-Clark transformations are needed to transform the single phase parameters of the apparatus into three phase ones. Moreover, the vector control strategies are themselves complex, and expensive meters, particularly an angular position sensor such as an alternator encoder, are needed for implementing this type of strategy. A simple and cost-effective control system for the apparatus is provided in this disclosure. The control system modulates the speed of the driving engine in response to load changes for minimizing fuel consumption. Moreover, the amplitude and frequency of the excitation current in the rotor windings are modulated to make the amplitude and frequency of the output voltage from the stator constant (i.e., to achieve constant voltage and constant frequency). In this disclosure, the off-grid power generating apparatus is a power generating system whose connection to an electrical power grid is temporarily or permanently unavailable. A single phase winding of the stator refers to that the coil of the stator has only one axial direction. The single phase winding of the stator may include a plurality of coils but the axial direction of the plurality of coils should coincide. Symmetric phase windings are windings configured to form a rotating magnetic field that is an air gap magnetic field of a motor with a constant magnitude. The plurality of symmetric phase windings may have two or more phases.

The off-grid power generating apparatus for powering an electrical load includes an engine, an alternator and an excitation control device in accordance with some embodiments. The alternator includes a rotor, a stator, a voltage sensor, a current sensor and a speed sensor. The rotor is coaxially coupled to the engine, and includes a plurality of symmetric phase windings. The stator includes a single phase winding configured to generate an induced voltage. The single phase winding is configured to be connected with the electrical load and the phase windings of the rotor respectively and provide an output voltage to the electrical load and an excitation voltage to the phase windings of the rotor. The voltage sensor is configured to measure an amplitude of the output voltage. The current sensor is configured to measure the amplitude of the alternating current applied to the electrical load. The speed sensor is configured to measure the rotation speed of the rotor or the engine. The excitation control device is operatively connected with the engine and the alternator that is configured to control the induced voltage generated in the single phase winding of the stator by regulating the rotating magnetic field generated in the phase windings of the rotor. The excitation control device includes a first calculating element, a first modulating element, a second calculating element, a third calculating element and a second modulating element. The first calculating element is configured to calculate the load power of the electrical load at least in accordance with the measured amplitudes of the output voltage and the alternating current, and determine a desired rotation speed of the engine at least in accordance with the calculated load power. The first calculating element may be implemented by two modules, which separately perform the step of calculating the load power and the step of obtaining the desired rotation speed. The first modulating element is configured to modulate the speed of the engine at least in accordance with the desired rotation speed of the engine. The second calculating element is configured to determine a slip angle at least in accordance with the rotation speed of the rotor or the engine measured by the speed sensor. The third calculating element is configured to determine a target voltage of the rotor at least in accordance with the amplitude of the output voltage measured by the voltage sensor. The second modulating element is configured to generate a modulating signal at least in accordance with the target voltage of the rotor and the slip angle, and modulate a frequency and an amplitude of an excitation current in the phase windings of the rotor with the modulating signal.

The alternator comprising a frequency conversion device connected with the single phase winding of the stator in accordance with some embodiments. The frequency conversion device includes an inverter to provide the excitation voltage to the phase windings of the rotor.

The alternator includes a switch operatively connected with the electrical load and being movable from a first position to a second position by a user in accordance with some embodiments. The single phase winding of the stator includes a first segment and a second segment each of which has at least one coil that are operatively and separately connected with the switch. The output voltage includes a high output voltage and a low output voltage. The first segment and the second segment are configured to be in series connection at the first position of the switch and in parallel connection at the second position of the switch to provide the high output voltage and the low output voltage respectively to the electrical load via the switch. The voltage sensor is configured to measure the amplitudes of a first and a second output voltage provided by the first and the second segment to the electrical load. The current sensor is configured to measure the amplitudes of a first and a second alternating current applied respectively by the first and the second segment to the electrical load. The first calculating element is configured to calculate a first and a second load power of the electrical load at least in accordance with the measured amplitudes of the first output voltage and the first alternating current, and the second output voltage and the second alternating current, and calculate a total load power by adding the first and the second load power, and obtain the desired rotation speed of the engine at least in accordance with the total load power. The third calculating element is configured to determine a target voltage of the rotor at least in accordance with the amplitude of the first or the second output voltage.

The alternator includes a switch that is operatively connected with the electrical load and is movable from a first position to a second position by a user. The single phase winding of the stator includes a first segment and a second segment each of which has at least one coil that are operatively and separately connected with the switch. The output voltage includes a high output voltage and a low output voltage. The first segment and the second segment are configured to be in series connection at the first position of the switch and in parallel connection at the second position of the switch to provide the high output voltage and the low output voltage respectively to the electrical load via the switch. The voltage sensor is configured to measure the amplitudes of a first and a second output voltage provided by the first segment and the second segment to the electrical load, and a total output voltage when the first segment and the second segment are in series connection. The current sensor is configured to measure the amplitudes of a first and a second alternating current applied respectively by the first and the second segment to the electrical load. When the first segment and the second segment are in series connection at the first position of the switch to provide the high output voltage, the first calculating element is configured to calculate a total load power at least in accordance with the measured amplitudes of the total output voltage and either of the first alternating current and second alternating current.

The first calculating element is also configured to obtain the desired rotation speed of the engine at least in accordance with the total load power. When the first segment and the second segment are in parallel connection at the second position of the switch to provide the low output voltage, the first calculating element is configured to calculate a first and a second load power of the electrical load at least in accordance with the measured amplitudes of the first output voltage and the first alternating current, and the second output voltage and the second alternating current. The first calculating element is also configured to calculate a total load power by adding the first and the second load power, and to obtain the desired rotation speed of the engine at least in accordance with the total load power. The third calculating element is configured, when the first segment and the second segment are in series connection at the first position of the switch to provide the high output voltage, to determine a target voltage of the rotor at least in accordance with the amplitude of the total output voltage. The third calculating element is also configured, when the first segment and the second segment are in parallel connection at the second position of the switch to provide the low output voltage, to determine a target voltage of the rotor at least in accordance with the amplitude of the first or the second output voltage.

The third calculating element is configured to determine the target voltage of the rotor with a closed control loop in accordance with some embodiments.

The alternator includes an electrical circuit connecting the single phase winding of the stator and the electrical load in accordance with some embodiments. The electrical circuit is configured in a way that the induced voltage generated in the single phase winding of the stator and the output voltage applied to the electrical load are at the same frequency.

A control method of an off-grid power generating apparatus for powering an electrical load is provided in accordance with some embodiments. The apparatus has an engine and an alternator that includes a stator with a single phase winding configured to generate an induced voltage and a rotor with a plurality of symmetric phase windings. The rotor is coaxially coupled to the engine. The single phase winding of the stator is connected with the electrical load and the phase windings of the rotor respectively to provide an output voltage to the electrical load and an excitation voltage to the phase windings of the rotor. The method includes the operations as follows. Measure the amplitude of the output voltage provided to the electrical load. Measure the amplitude of the alternating current provided to the electrical load. Measure the rotation speed of the rotor or the engine. Calculate the load power of the electrical load at least in accordance with the measured amplitudes of the output voltage and the alternating current. Determine the desired rotation speed of the engine at least in accordance with the calculated load power. Modulate the speed of the engine at least in accordance with the desired rotation speed of the engine. Determine a slip angle at least in accordance with the measured rotation speed of the rotor or the engine and the synchronous speed of the alternator. Determine the target voltage of the rotor at least in accordance with the amplitude of the measured output voltage. Generate a modulating signal at least in accordance with the target voltage of the rotor and the slip angle. Modulate the frequency and the amplitude of an excitation current in the phase windings of the rotor with the modulating signal.

In accordance with some embodiments of the method, the alternator includes a frequency conversion device connected with the single phase winding of the stator. The frequency conversion device includes an inverter to provide the excitation voltage to the phase windings of the rotor.

In accordance with some embodiments of the method, the alternator includes a switch that is operatively connected with the electrical load and is movable between a first position and a second position by a user. The single phase winding of the stator includes a first segment and a second segment each of which has at least one coil that is operatively and separately connected with the switch. The output voltage includes a high output voltage and a low output voltage. The first segment and the second segment are configured to be in series connection at the first position of the switch and in parallel connection at the second position of the switch to provide the high output voltage and the low output voltage respectively to the electrical load via the switch. Measuring an amplitude of the output voltage includes measuring the amplitudes of a first and a second output voltage provided by the first and the second segment to the electrical load. Measuring an amplitude of an alternating current includes measuring the amplitudes of a first and a second alternating current applied respectively by the first and the second segment to the electrical load. Calculating a load power of the electrical load includes calculating a first and a second load power of the electrical load at least in accordance with the measured amplitudes of the first output voltage and the first alternating current, and the second output voltage and the second alternating current, and a total load power by adding the first and the second load power. Determining a desired rotation speed of the engine at least in accordance with the calculated load power includes determining the desired rotation speed of the engine at least in accordance with the total load power. Determining a target voltage of the rotor includes determining the target voltage of the rotor at least in accordance with the amplitude of the first or the second output voltage.

In accordance with some embodiments of the method, the alternator includes a switch that is operatively connected with the electrical load and is movable from a first position to a second position by a user. The single phase winding of the stator includes a first segment and a second segment each of which has at least one coil that are operatively and separately connected with the switch. The output voltage includes a high output voltage and a low output voltage. The first segment and the second segment are configured to be in series connection at the first position of the switch and in parallel connection at the second position of the switch to provide the high output voltage and the low output voltage respectively to the electrical load via the switch. Measuring an amplitude of the output voltage includes measuring the amplitudes of a first and a second output voltage provided by the first segment and the second segment to the electrical load, and a total output voltage when the first segment and the second segment are in series connection. Measuring an amplitude of an alternating current includes measuring the amplitudes of a first and a second alternating current applied respectively by the first and the second segment to the electrical load. When the first segment and the second segment are in series connection at the first position of the switch to provide the high output voltage, calculating a load power of the electrical load includes calculating a total load power at least in accordance with the measured amplitudes of the total output voltage and either of the first alternating current and second alternating current. Determining a desired rotation speed of the engine includes determining the desired rotation speed of the engine at least in accordance with the total load power. Determining a target voltage of the rotor includes determining the target voltage of the rotor at least in accordance with the amplitude of the measured total output voltage. When the first segment and the second segment are in parallel connection at the second position of the switch to provide the low output voltage, calculating a load power of the electrical load includes calculating a first and a second load power of the electrical load at least in accordance with the measured amplitudes of the first output voltage, the first alternating current, the second output voltage and the second alternating current, and calculating a total load power by adding the first and the second load power. Determining a desire rotation speed of the engine includes determining the desired rotation speed of the engine at least in accordance with the total load power. Determining a target voltage of the rotor includes determining the target voltage of the rotor at least in accordance with the amplitude of the first or the second output voltage.

An off-grid portable generator set for powering an electrical load is provided in accordance with some embodiments. The generator set includes an engine, an induction alternator and an excitation control device. The alternator includes a rotor, a stator, a voltage sensor, a current sensor and a speed sensor. The rotor is coaxially coupled to the engine, and includes a plurality of symmetric phase windings. The stator includes a single phase winding configured to generate an induced voltage. The single phase winding is connected with the electrical load and the phase windings of the rotor respectively to provide an output voltage to the electrical load and an excitation voltage to the phase windings of the rotor. The voltage sensor is configured to measure an amplitude of the output voltage. The current sensor is configured to measure the amplitude of the alternating current applied to the electrical load. The speed sensor is configured to measure the rotation speed of the rotor or the engine. The excitation control device is operatively connected with the engine and the alternator that is configured to control the induced voltage generated in the single phase winding of the stator by regulating the rotating magnetic field generated in the phase windings of the rotor. The excitation control device includes a first calculating element, a first modulating element, a second calculating element, a third calculating element and a second modulating element. The first calculating element is configured to calculate a load power of the electrical load at least in accordance with the measured amplitudes of the output voltage and the alternating current, and determine a desired rotation speed of the engine at least in accordance with the calculated load power. The first modulating element is configured to modulate the speed of the engine at least in accordance with the desired rotation speed of the engine. The second calculating element is configured to determine a slip angle at least in accordance with the rotation speed of the rotor or the engine measured by the speed sensor. The third calculating element is configured to determine a target voltage of the rotor at least in accordance with the amplitude of the output voltage measured by the voltage sensor. The second modulating element is configured to generate a modulating signal at least in accordance with the target voltage of the rotor and the slip angle, and modulate a frequency and an amplitude of an excitation current in the phase windings of the rotor with the modulating signal.

The off-grid power generating apparatus has a stator with a single phase winding and a rotor with a plurality of symmetric windings that generate a rotating magnetic field. The combination of a stator with a single winding and a rotor with a plurality of symmetric phase windings enables the apparatus to power single phase electrical devices with small rated powers such as household appliances while keeping the control system of the apparatus simple and easy to implement. The control method modulates the engine speed in response to load changes to minimize fuel consumption. Moreover, the amplitude and frequency of the excitation current in the rotor windings are modulated to keep the output voltages output from the stator side stable.

DETAILED DESCRIPTION

References are made to the accompanying drawings that form a part hereof, and in which is shown by way of illustration of the embodiments in which the embodiments may be practiced. Similar reference numbers indicate similar parts in all diagrams.

Figure 1:
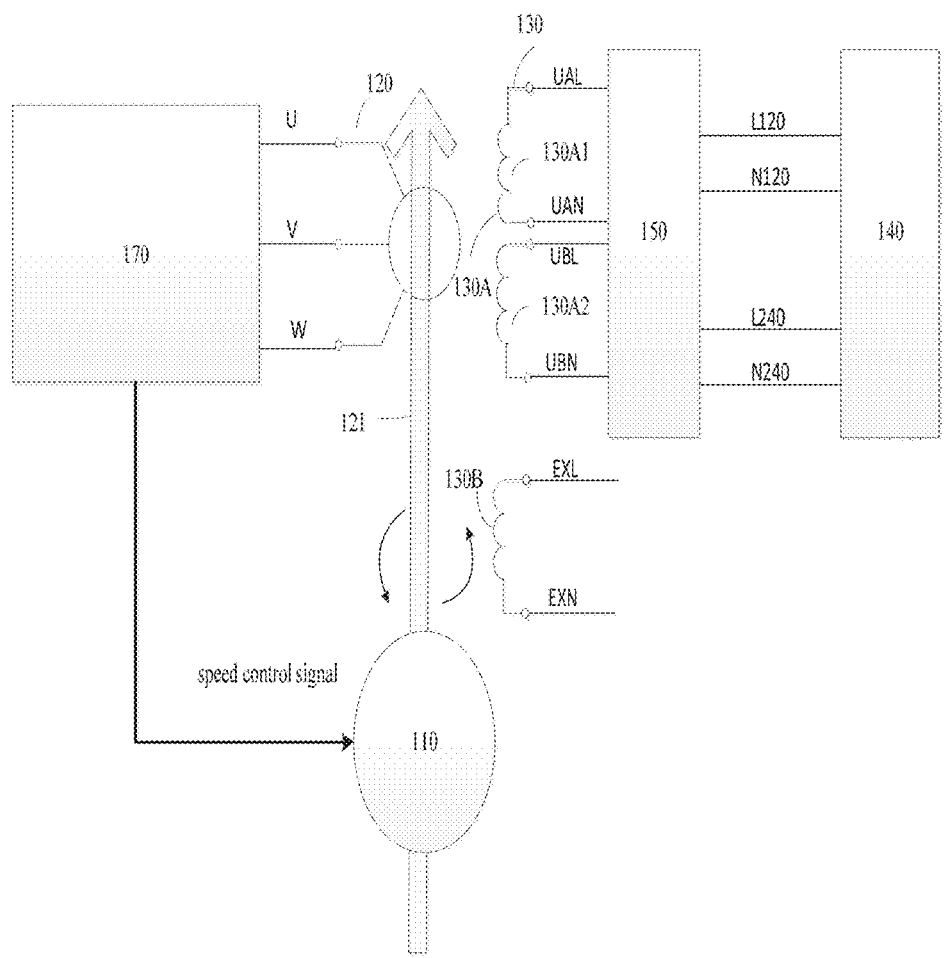
FIG. 1 is a schematic diagram of an off-grid power generating apparatus in accordance with some embodiments.

FIG. 1 is a schematic diagram of an off-grid power generating apparatus in accordance with some embodiments. An electrical load 140 may be an electrical appliance, e.g., an oven or an audio player that people use while doing camping and electrical appliances used during blackout. The off-grid apparatus includes an engine 110, an alternator and excitation control device 170. The engine 110 may receive fuel such as gasoline, diesel, natural gas, or liquid propane vapor through an intake. The fuel provided to the engine 110 is compressed and ignited to generate reciprocating motion of pistons of the engine 110. The reciprocating motion of the piston of the engine 110 is converted to rotary motion by a crankshaft of the engine 110, which is operatively coupled to the alternator. The alternator may be an induction alternator with a variable speed and constant frequency. Specifically, the alternator includes a rotor 120 and a stator 130. The rotor 120 may be a cylindrical rotor having a plurality of symmetric phase windings. It is received within the stator 130 and coaxially coupled with the crankshaft of the engine 110 through a common shaft 121. As the engine 110 rotates, the common shaft 121 drives the rotor 120 to rotate and a rotating magnetic field is established in the symmetric phase windings of the rotor 120. The excitation control device 170 controls and monitors the alternator and the engine 110, which will be described with more details below.

In accordance with some embodiments, the stator 130 of the alternator includes a single phase winding in which a single phase voltage is induced responsive to the rotation of the magnetic field established in the plurality of symmetric phase windings of the rotor 120. The induced voltage may be delivered directly as an output voltage to the electrical load 140 via an electrical circuit in accordance with some embodiments. The electrical circuit includes power lines L120, N120, L240 and N240 and other electrical parts such as switch 150 illustrated in FIG. 1. The electrical circuit may include a wire and a plug for connecting the single phase winding and the electrical load. Protection mechanisms such as a circuit breaker may be provided in the electrical circuit for breaking the circuit when it is overpowered. The electrical circuit may also include an auto transfer system for switching between different output voltages. The electrical circuit herein does not include a frequency conversion device such as a converter and an inverter that changes the frequency of the voltage in accordance with some embodiments. In other words, the electrical circuit is configured in a way that the induced voltage generated in the single phase winding and the output voltage applied to the load are at the same frequency. The excitation control device 170 modulates the frequency of the induced voltage so that the frequency remains at a predetermined range, for example, 60 hertz (Hz) in North America and 50 Hz in China. Accordingly, the induced voltage is applicable to most electric equipment, which is designed with a fixed nominal frequency. In this manner, the frequency of the output voltage also remains at the predetermined range, since the induced voltage and the output voltage are at the same frequency.

The single phase winding of the stator 130 may provide not only the output voltage, but also an excitation voltage to the phase windings of the rotor 120 in accordance with some embodiments. The output voltage provided to the electric load from the stator side tends to vary when the engine speed changes. The output voltage is induced and affected by the magnetic field induced in the rotor windings. To prevent the output voltage from changing, the current in the phase windings of the rotor is regulated to offset the variation tendency of the induced voltage. In this manner, the amplitude and the frequency of the output voltage output from the stator 130 are kept stable.

The single phase winding of the stator 130 may include an output portion 130A and an excitation portion 130B as illustrated in FIG. 1 in accordance with some embodiments. The output portion 130A and the excitation portion 130B include at least one coil respectively. The output portion 130A and the excitation portion 130B provide the output voltage to the load and the excitation voltage to the rotor windings respectively in accordance with some embodiments.

Figure 2A:
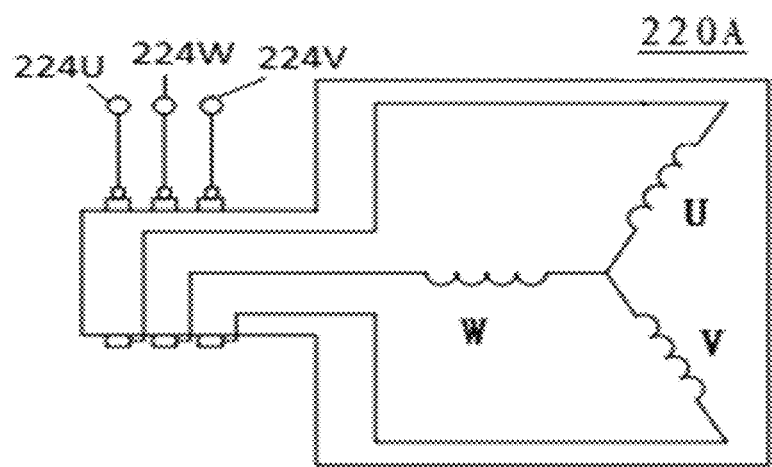
FIG. 2A illustrates an arrangement of the rotor in accordance with some embodiments.
Figure 2B:
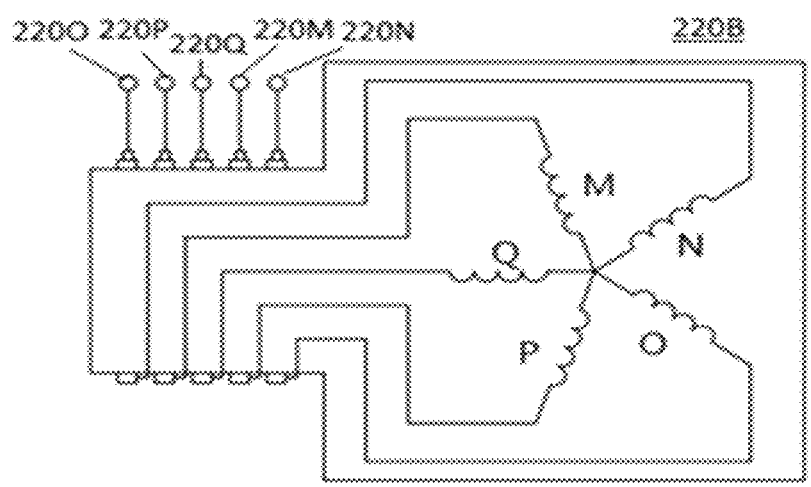
FIG. 2B illustrates another arrangement of the rotor in accordance with some embodiments.
Figure 2C:
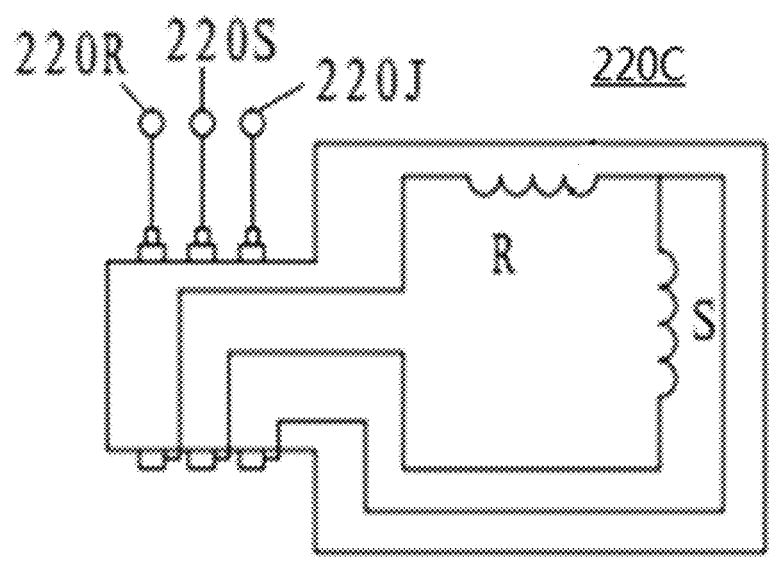
FIG. 2C illustrates another arrangement of the rotor in accordance with some embodiments.

The rotor 120 may include a plurality of symmetric phase windings. FIG. 2A illustrates an arrangement of the rotor 220A in accordance with some embodiments. The rotor 220A has three phase windings U, V and W in a star connection. The axes of the three phase windings U, V and W are spatially separated at an angular degree of 120°. Each of the three phase windings U, V and W may include one coil with an equal number of coil turns. Terminal of the coils may be connected via binding posts 224U, 224V and 224W. Other symmetric configurations of three phase windings such as a delta connection are also applicable to the power generating apparatus. FIG. 2B illustrates another arrangement of the rotor in accordance with some embodiments. The rotor 220B includes five phase windings M, N, O, P and Q arranged in a symmetric manner, i.e., the axes of the five phase windings M, N, O, P and Q are spatially separated at an angular degree of 72°. Each of the five phase windings M, N, O, P and Q may include one coil with an equal number of coil turns. Terminal of the coils may be connected via binding posts 220O, 220P, 220Q, 220M and 220N. FIG. 2C illustrates another arrangement of the rotor 220C in accordance with some embodiments. Two symmetric phase windings R and S which are separate spatially at an angular degree of 90° are provided. Each of the two phase windings R and S may include one coil with an equal number of coil turns. Terminals of the coils may be connected via binding posts 220R, 220S and 220J.

Figure 10:
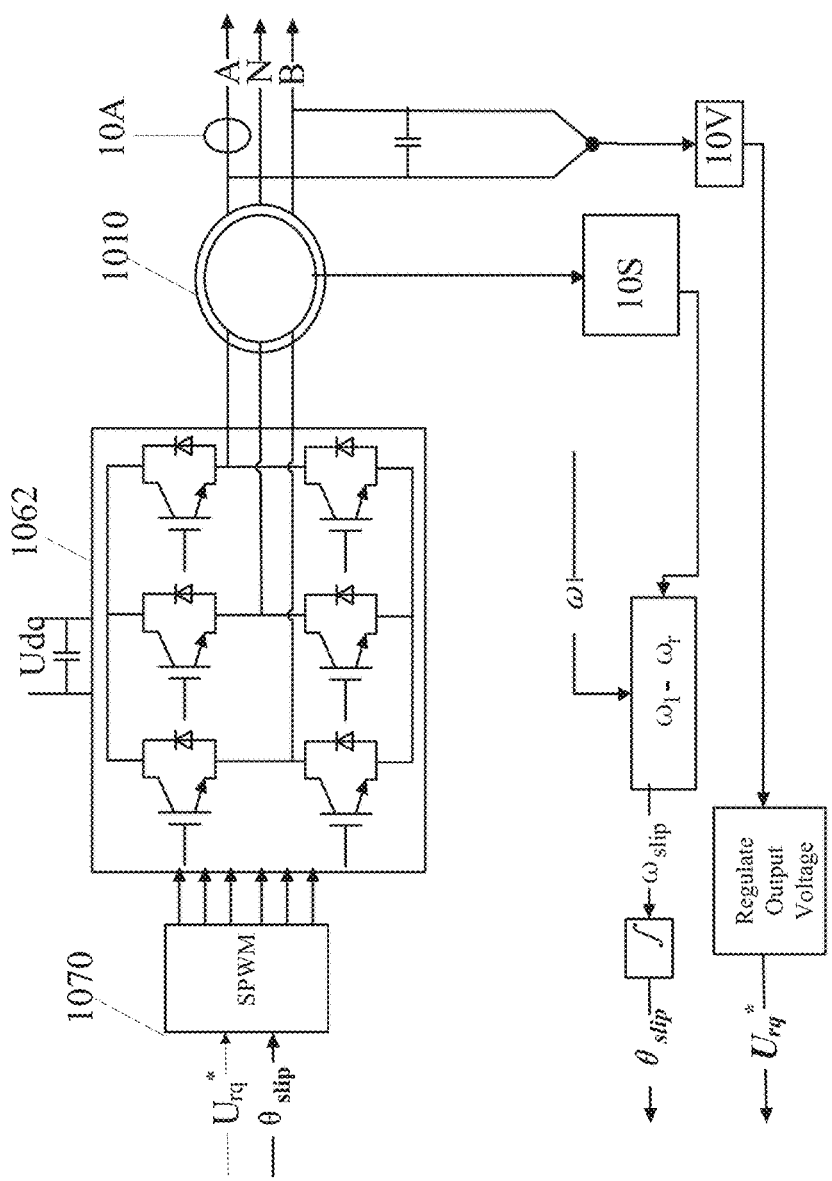
FIG. 10 illustrates a control system for implementing a control strategy in accordance with some embodiments.
Figure 13:
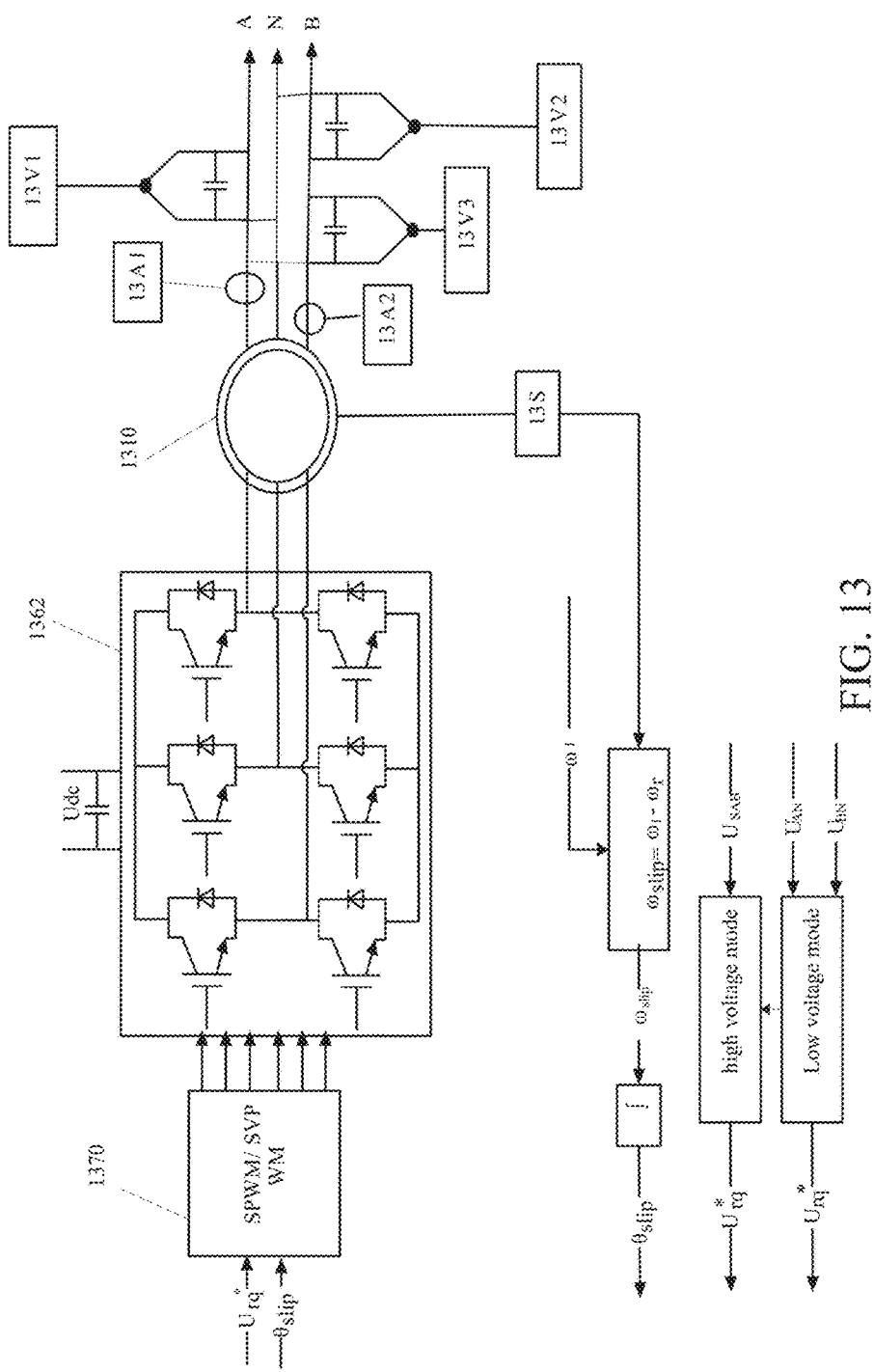
FIG. 13 illustrates another control system for implementing another control strategy in accordance with some embodiments.
Figure 16:
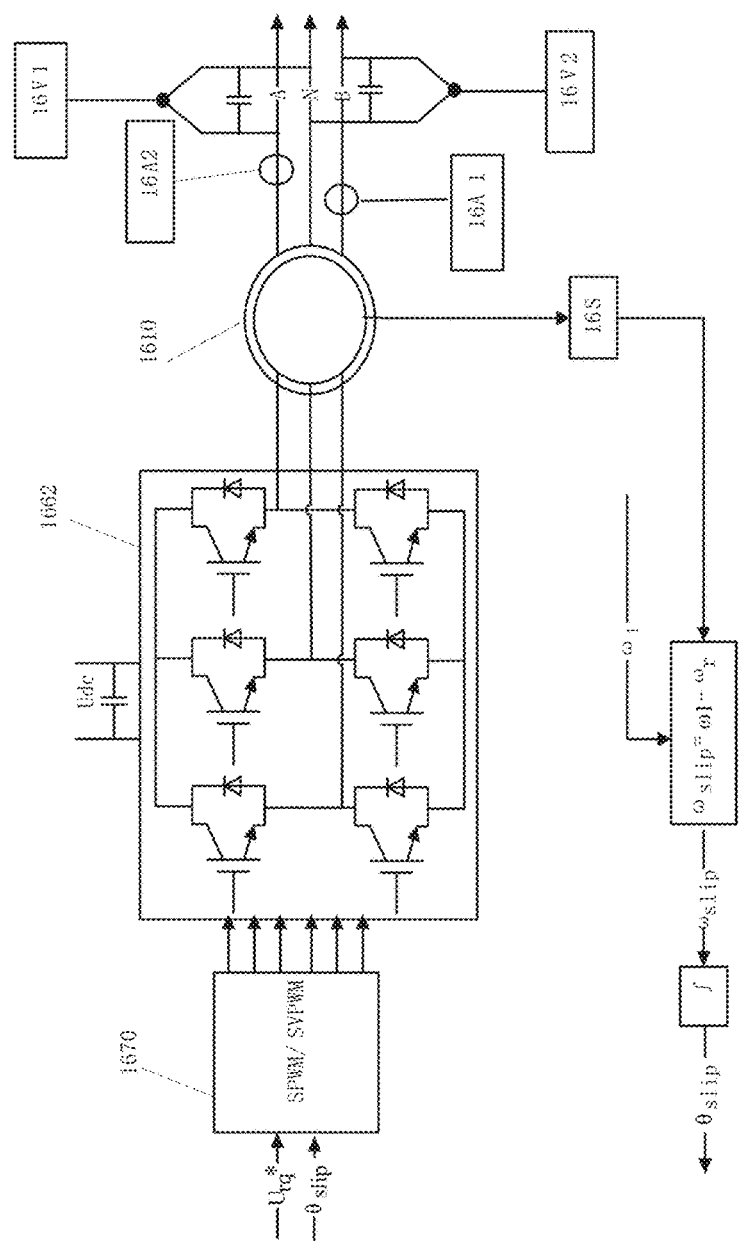
FIG. 16 illustrates another control system for implementing another control strategy in accordance with some embodiments.

In accordance with some embodiments, the alternator includes a voltage sensor for measuring the amplitude of the output voltage $U_{LOAD}$ output from the single phase winding of the stator, a current sensor for measuring the amplitude of the alternating current $I_{LOAD}$ applied to the electrical load, and a speed sensor for measuring the rotating speed of the rotor or the engine $\omega_r$ (not illustrated in FIG. 1 but in FIGS. 10, 13 and 16). The amplitudes of the output voltage and the alternating current and the rotating speed can be real time values measured by the sensors, for example, real time values measured every millisecond or every second. They can also be the averages or integrals of some real time values measured by the sensors in a period. For example, the sensors measure real time values every second, and the amplitudes of the output voltage and the load current and the rotating speed can be the averages or integrals of the measured real time values in every 10 successive seconds. The measured operation data of the apparatus from the current sensor, voltage sensor and speed sensor can be modulated, filtered and then sent to the excitation control device 170. A microprocessor-based or otherwise computer-driven system can work as the excitation control device 170. The excitation control device 170 has a processor and a memory for storing program instructions for implementing the control functions of the excitation device. The processor operates under the direction of the stored program instructions. Optionally, the excitation control device 170 may be provided with a logic circuit such as CMOS (Complementary Metal Oxide Semiconductor), ASIC (Application Specific Integrated Circuits), PGA (Programmable Gate Array), FPGA (Field-programmable Gate Array) and so on for implementing its control functions.

Figure 3:
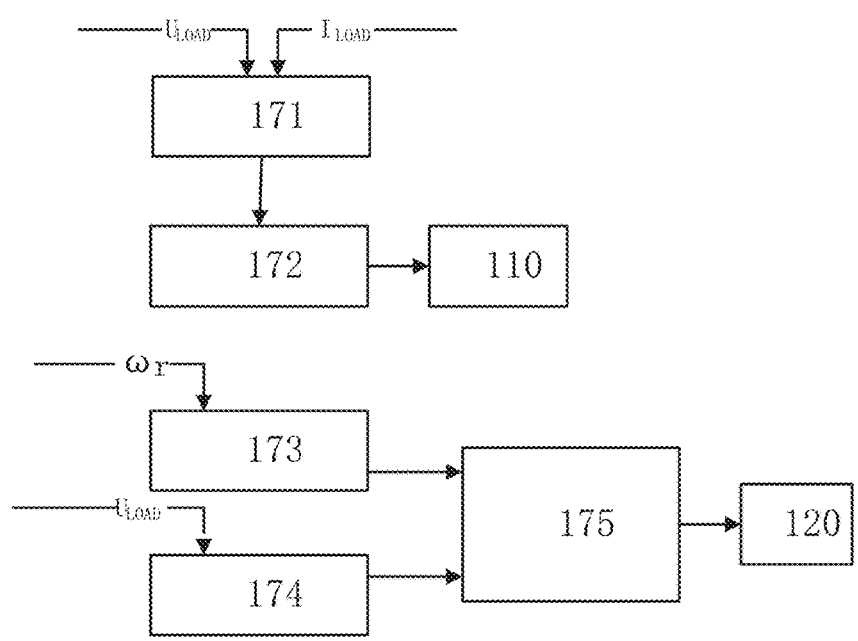
FIG. 3 is a schematic diagram illustrating the structure of an excitation control device in accordance with some embodiments.

As illustrated in FIG. 3, the excitation control device 170 has a first calculating element 171, a first modulating element 172, a second calculating element 173, a third calculating element 174 and a second modulating element 175 in accordance with some embodiments. The first calculating element 171 calculates the load power of the electrical load at least in accordance with the measured amplitudes of the output voltage $U_{LOAD}$ and the alternating current $I_{LOAD}$ The first modulating element 172 obtains the desired rotation speed of the engine at least in accordance with the calculated load power, and modulates the speed of the engine at least in accordance with the desired rotation speed of the engine. The second calculating element 173 determines a slip angle at least in accordance with the rotation speed of the rotor or the engine $\omega_r$ measured by the speed sensor. The third calculating element 174 determines the target voltage of the rotor at least in accordance with the amplitude of the output voltage measured by the voltage sensor. The second modulating element 175 generates a modulating signal at least in accordance with the target voltage of the rotor and the slip angle, and modulates the frequency and amplitude of the excitation current in the phase windings of the rotor with the modulating signal.

Reference is now made back to FIG. 1. The excitation control devices 170 is electrically connected with the engine 110. The control device 170 may be physically attached to the alternator, and connected with the engine 110 via a wire or a wireless device. The excitation control device 170 collects operation data measured by the voltage sensor, current sensor and speed sensor, and modulates the engine speed and the frequency and amplitude of the excitation current in the phase windings of the rotor in response to the operation data. While the excitation control device 170 directly controls the engine 110 in the embodiments described above, the engine 110 may also be directly controlled by an engine control module (ECM) not shown in the figures. The ECM controls the engine speed, and thereby controls the output power of the alternator. The excitation control device 170 controls the ECM. The ECM may be physically attached to the engine 110. A communication bus is provided between the excitation control device 170 and the ECM for transmitting communication data between them. In addition to the engine speed, the ECM may also monitors a variety of engine characteristics such as fuel consumption, engine start information and oil pressure.

The output portion has more than one coil to provide an output voltage at dual levels in accordance with some embodiments. The output portion 130A includes a first segment 130A1 and a second segment 130A2 in FIG. 1. The first segment 130A1 includes one coil with a first terminal line UAL, which may be a live line, and a second terminal line UAN, which may be a neutral line. The second segment 130A2 may include another coil with a third terminal line UBL and a fourth terminal line UBN, which may be a live line and a neutral line respectively. The first segment 130A1 and the second segment 130A2 may separately include a plurality of coils in series in accordance with some embodiments.

The terminal lines UAL, UAN, UBL and UBN of the first segment 130A1 and the second segment 130A2 are separately connected to the switch 150, which, in turn, is connected with the electrical load 140. A user may switch over the switch 150 to selectively connect the first segment 130A1 and the second segment 130A2 in parallel or in series. In this manner, an output voltage at dual levels, for example, 120 volts or 240 volts, which are the most commonly used nominal voltages in North America, may be generated and delivered from the output portion 130A to the load via the switch 150.

The power generating apparatus includes a switch 150 in accordance with some embodiments as shown in FIG. 1. The switch 150 may be a manually operated changeover switch or similar switches. The terminal lines UAL, UAN, UBL and UBN of the first segment 130A1 and the second segment 130A2 are separately connected to the switch 150 in accordance with some embodiments. A user may switch over the switch 150 to selectively connect the first segment 130A1 and the second segment 130A2 in parallel or in series. In this manner, an output voltage at dual levels, a low voltage (for example, 120 volts) and a high voltage (for example, 240 volts), may be generated and delivered from the output portion 130A to the load through the switch 150. Optionally, a plug connected with the electric load and two sockets connected with the first segment 130A1 and the second segment 130A2 may be used by a user to switch between the low voltage and the high voltage. For example, the user may put the plug in one socket through which the first segment 130A1 and the second segment 130A2 are in series connection to provide the electric load with the high voltage. The user may put the plug in the other socket through which the first segment 130A1 and the second segment 130A2 are in parallel connection (or either of the two segments connected) to provide the electric load with the low voltage. In some embodiments, the switch 150 (including any sensor associated with the switch 150) may send a signal to the excitation control device, indicating whether the one or both of the segments are connected or whether the connection is in parallel or in series.

The excitation portion 130B may include one coil that has terminal lines connected to the phase windings of the rotor U, V and W to apply the induced voltage generated in the excitation portion 130B to the phase windings for energizing the rotating magnetic field. The excitation portion 130B, independent of the output portion 130A, can provide an excitation voltage greater than the output voltage in a simple manner. For example, an excitation voltage of 320 volts (higher than a normal 220 volts) can be provided when the excitation portion 130B has a sufficient number of winding turns. The stator of the apparatus may have only one coil in total in accordance with some embodiments. An output voltage at one single level is generated and delivered to the electrical load from the stator. This stator operates in a way similar to the way when the output portion 130A and the excitation portion 130B illustrated in FIG. 1 are permanently connected together. Those skilled in the art would understand how the stator with one single coil operates with reference to the description above.

Figure 4:
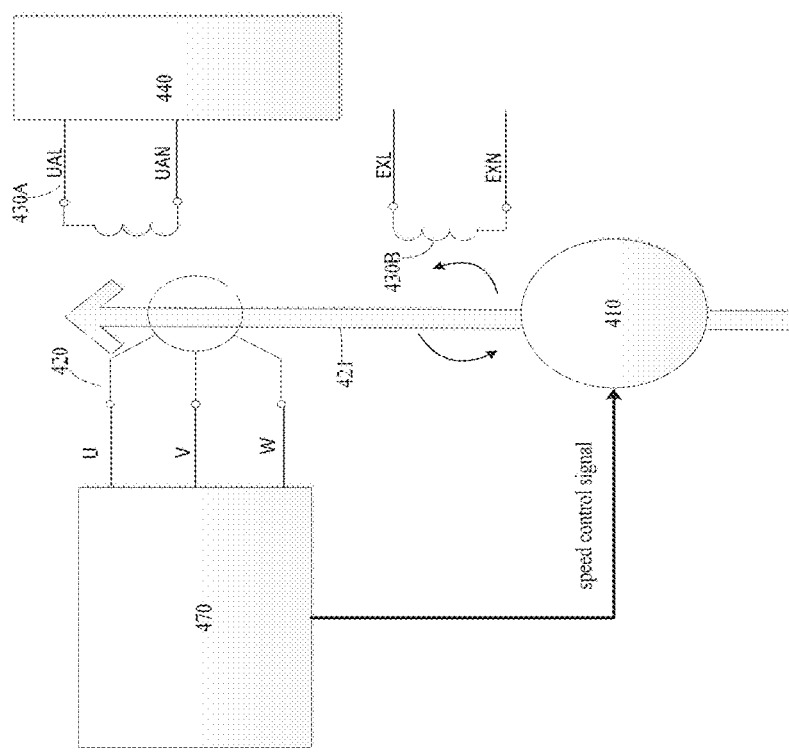
FIG. 4 is a schematic diagram of another off-grid power generating apparatus in accordance with some embodiments.

FIG. 4 is a schematic diagram of another off-grid power generating apparatus in accordance with some embodiments. The output portion 430A of the stator winding has only one coil in which an output voltage at one single level, e.g., 120 volts or 240 volts, is generated. The output voltage is provided to the electrical load 440 via a circuit, which includes the live line and the neutral line in FIG. 4.

Figure 5:
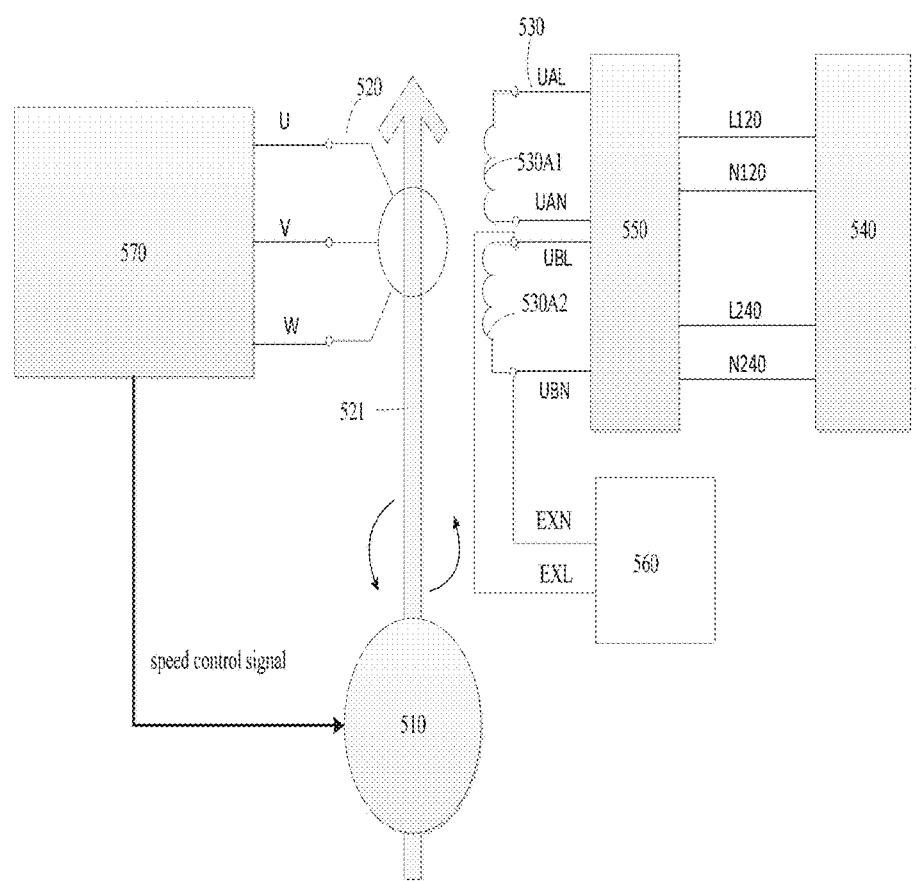
FIG. 5 is a schematic diagram of yet another off-grid power generating apparatus in accordance with some embodiments.

FIG. 5 is a schematic diagram of yet another off-grid power generating apparatus in accordance with some embodiments. Similar reference numbers are used in FIGS. 1, 4 and 5 to indicate similar structural parts. For example, the reference numbers of 170, 470 and 570 in FIGS. 1, 4 and 5 all refer to the excitation control device for controlling and monitoring the alternator and the engine. The single phase winding of the stator 530 may include a first portion 530A1 and a second portion 530A2 in accordance with some embodiments. The first portion 530A1 may include one coil with terminal lines UAL and UAN, and the second portion 530A2 may include another coil with terminal lines UBL and UBN. The terminal lines UAL, UAN, UBL and UBN are separately connected to the switch 550. A user may switch over the switch 550 to selectively connect the first portion 530A1 and the second portion 530A2 in parallel or in series to obtain an output voltage of 120 volts or 240 volts. Unlike the apparatus illustrated in FIG. 1 that has a separate excitation portion, the first portion 530A1 or the second portion 530A2 of this apparatus is also used to provide the excitation voltage. For example, as illustrated in FIG. 5, the second portion 530A2 has an extra pair of terminal lines EXN and EXL that are connected to the phase windings of the rotor (not illustrated in FIG. 5).

The second portion 530A2 may include more than one coil in series connection in accordance with some embodiments (not illustrated in FIG. 5), for example, a first coil and a second coil connected in series. The live line and neutral line of the first coil are connected to the switch to provide the output voltage, and the live lines of the first coil and the second coil are connected to the rotor circuit, i.e., the series voltage generated by the first coil and the second coil in series connection works as the excitation voltage. Compared with a stator with a separate excitation coil, the coil number of the excitation coil in this stator is reduced.

Figure 6A:
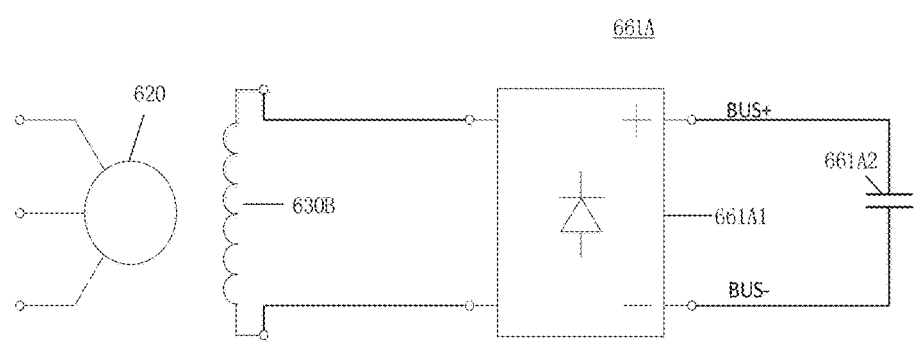
FIG. 6A illustrates a DC bus voltage regulator in accordance with some embodiments.
Figure 6B:
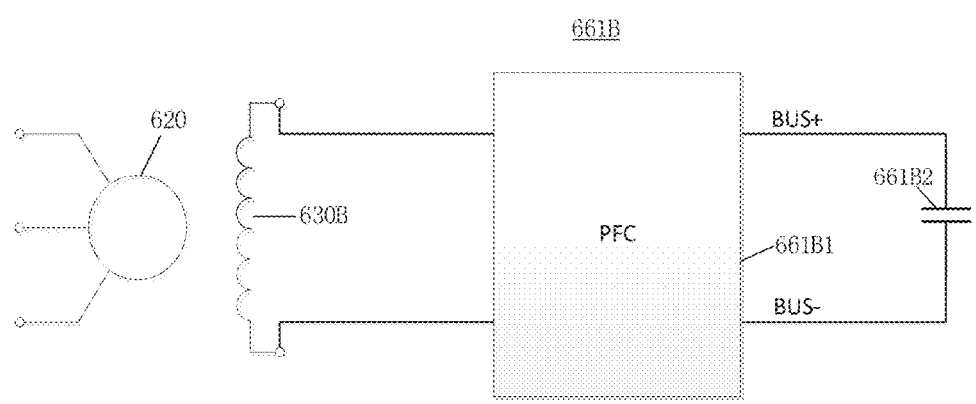
FIG. 6B illustrates another DC bus voltage regulator in accordance with some embodiments.

A frequency conversion device 560 may be provided between the second portion 530A2 and the phase windings of the rotor in accordance with some embodiments. The frequency conversion device 560, which is the so-called converter, regulates the induced voltage generated in the excitation portion 530A2 to generate a voltage with a desired frequency and amplitude to provide to the phase windings of the rotor for energizing the rotating magnetic field. The frequency conversion device 560 may include a DC bus voltage regulator, which receives the excitation voltage from the single phase winding of the stator and outputs a DC voltage to buses BUS+, BUS−. FIG. 6A illustrates a DC bus voltage regulator 661A in accordance with some embodiments. The DC bus voltage regulator 661A includes an uncontrolled Bridge Rectifier 661A that may have four individual rectifying diodes 661A1 connected in "bridge" configuration to receive the excitation voltage from the excitation portion 630B or either of the two portions of the single phase winding and generate the desired DC voltage. The main advantage of this bridge rectifier is that it does not require a special center tapped transformer, thereby reducing its size and cost. A bus capacitor 661A2 may be provided for smoothing the output of the uncontrolled Bridge Rectifier 661A to produce a DC voltage. FIG. 6B illustrates another DC bus voltage regulator 661B in accordance with other embodiments. A Power factor correction device 661B1 is used to rectify and boost the excitation voltage received from the single phase winding of the stator. A bus capacitor 661B2 may be provided to store energy and filter out high frequency voltage components.

Figure 7:
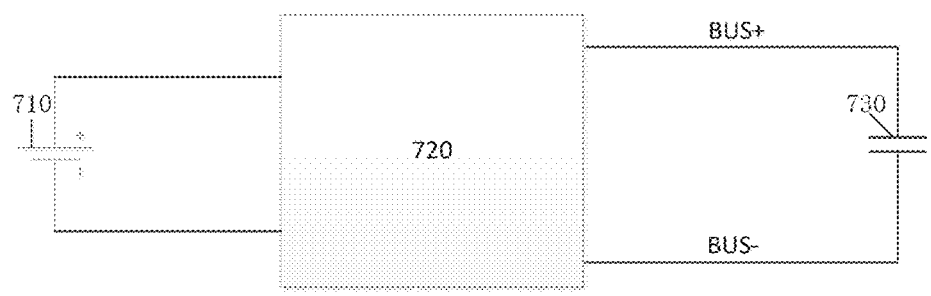
FIG. 7 illustrates another embodiment of providing an excitation voltage to the phase windings of the rotor in accordance with some embodiments.

FIG. 7 illustrates another embodiment of providing an excitation voltage to the phase windings of the rotor in accordance with some embodiments. A DC power source, which may be a battery 710, is used for supplying a DC voltage. A DC-DC converter 720 is connected with the battery 710 to increase the amplitude of the DC voltage before the DC voltage is applied to the buses BUS+ and BUS−, which is connected, to the phase windings of the rotor for energizing the rotating magnetic field. A bus capacitor 730 may be provided to store energy and filter out high frequency voltage components.

Figure 8:
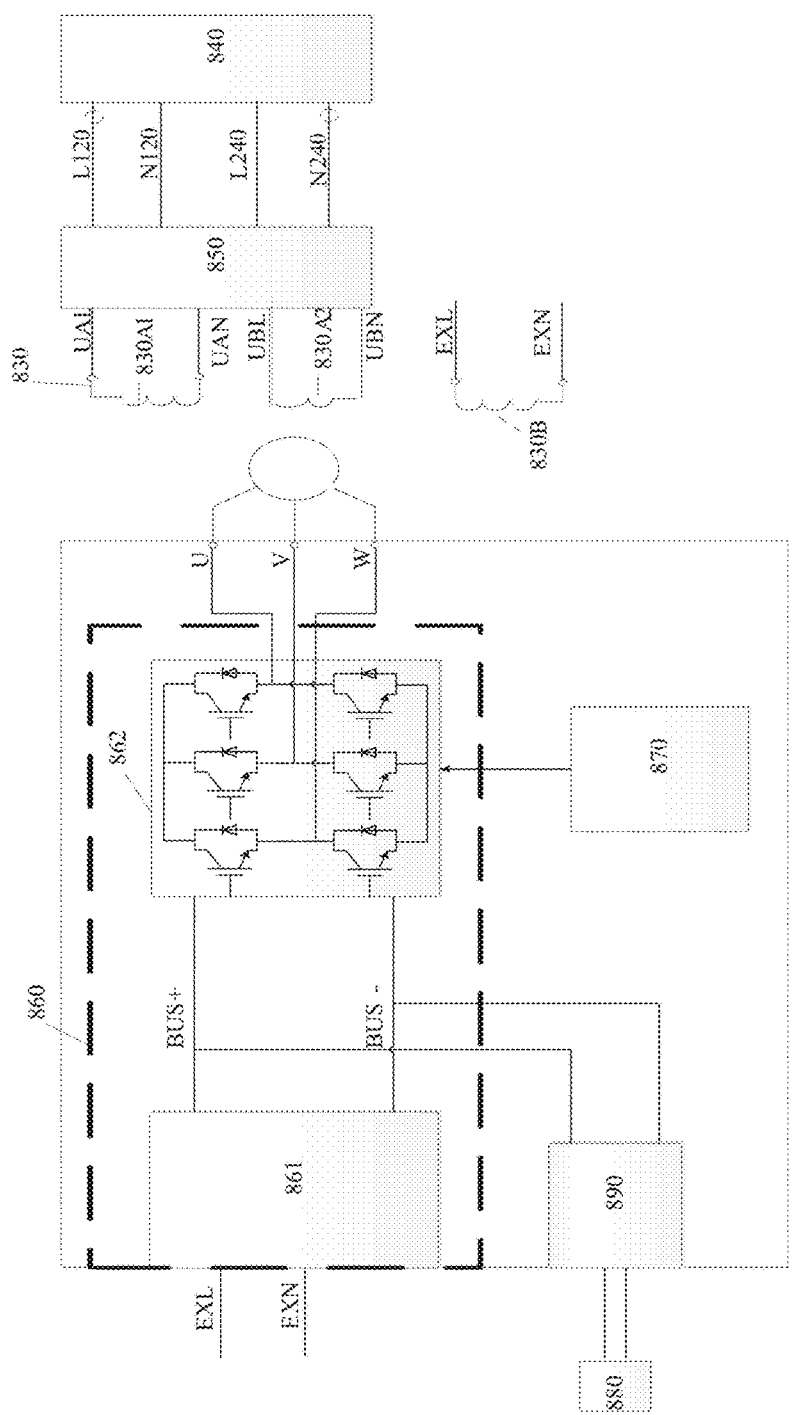
FIG. 8 is a schematic diagram of another off-grid power generating apparatus in accordance with some embodiments.

FIG. 8 is a schematic diagram of another off-grid power generating apparatus in accordance with some embodiments. This exemplary apparatus is similar to those described previously with reference to FIGS. 1 and 5, and therefore identical and similar parts will not be discussed again herein. The apparatus includes a frequency conversion device 860. The frequency conversion device 860 mainly includes a DC bus voltage regulator 861 and an inverter 862. The DC bus voltage regulator 861 is similar to those described above with reference to FIGS. 6A and 6B, and therefore the frequency conversion device will not be described again herein.

The inverter 862 can be a two-phase, three-phase, four-phase or five-phase DC/AC inverter corresponding to the number of the symmetric phase windings of the rotor. In FIG. 8, the inverter 862 is illustrated as a three-phase six-switch DC/AC inverter, which receives control pulse signals, for example, in the form of a PWM (pulse-width modulation) or SVPWM (space vector pulse width modulation) waveform from the excitation control device 870. The control pulse signals are duty ratios of switching-on time in substance. The excitation control device 870 is programmed to provide the pulse signals, which are PWM or SVPWM excitation signals with a desired amplitude and frequency. To keep the induced voltage constant, the pulse signals are employed to modulate the amplitude and frequency of the current in the phase windings of the rotor, in order to change the magnetic field in a way that offsets the variation tendency of the induced voltage. The excitation control device 870 applies the excitation signals to the rotor windings to regulate the intensity of the rotating magnetic field generated in the rotor windings and the rotating speed of the rotating magnetic field relative to the rotor. As a result, the amplitude and frequency of the output voltage output from the stator, i.e., the output voltage of the apparatus, are kept stable. The PWM or SVPWM waveform can be a square wave, modified sine wave and sine wave mainly depending on the circuit design of the inverter 862. Each leg of the inverter 862 may be connected with one phase winding of the rotor through wires. The inverter 862 has one or more switching element on each leg. The switching element can be a semiconductor switching element such as IGBT, BJT, MOSFET, GTO, SCR and IGCT. A pair of IGBTs is provided on each leg of the inverter 862 as illustrated in FIG. 8. The pulse signals from the excitation control device 870 successively control the switch ON and OFF time of the switching elements with duty ratios. A relatively stable DC voltage from the DC bus voltage regulator 861 is applied to the inverter 862 as illustrated in FIG. 8. The required input DC voltage of the inverter 862 mainly depends on the design and function of the inverter 862. Factors that can be considered include the amplitude of the induced voltage, the rotating speed range of the engine, the structure of the rotor windings, the current and voltage parameters of IGBT, etc. The inverter 862 generates PWM or SVPWM excitation signals with a desired frequency and amplitude, and the excitation signals are employed to modulate the amplitude and frequency of the current in the phase windings of the rotor so that a rotating magnetic field with a desired intensity and rotating speed relative to the rotor is established.

The frequency conversion device 860, particularly the inverter 862, is disposed on the rotor side in the embodiments. In other words, the induced voltage generated in the single phase winding of the stator is delivered to the electrical load without going through any frequency conversion device. The induced voltage and the output voltage applied to the load are at the same frequency. As a result, the rated power of the inverter 862 used in the apparatus with a rated power of 7,000 watts is less than 1,500 watts, usually the rated power of the inverter 862 is 700-800 watts. The rated power of an inverter in a power generator with a rated power of 7,000 watts in which an inverter is used to modulate the overall power generated by the generator is usually 7000 watts. Thus, inverters with a much smaller capacity can be used in the apparatus in the embodiments, since the inverter 862 only modulates a fraction of the overall power that is supplied to the rotor for modulating the amplitude and frequency of the output voltage of the apparatus output from the stator side. Accordingly, the inverter 862 is lighter and more cost-efficient. It is estimated that the cost of the inverter accounts for 20% to 60% of the cost of a traditional power generator. Therefore, the power generating apparatus in the embodiments described above enjoys a superb advantage in terms of costs.

The excitation control device 870 is programmed to calculate the load power of the engine by using the operation data measured by the current sensor and the voltage sensor (not shown in FIG. 8) and modulate the power of the engine, i.e., the speed of the engine in response to the calculated load power. The power of the engine is modulated to follow a pre-defined engine power-speed characteristic cure of the engine to track the maximum power point. The characteristic curve of the engine is a curve indicating a relationship of operation parameters of the engine, for example, the power, rotation torque and rotation speed of the engine. The characteristic curve can be pre-stored in the excitation control device 870.

The alternator may also include a battery 880 in accordance with some embodiments. The battery 880 may be electrically separated from the buses BUS+, BUS− for the sake of safety. The DC voltage of the battery 880 may be applied to the buses BUS+, BUS− through an excitation voltage provider 890 and provides an excitation voltage for establishing a rotating magnetic field in the rotor windings when the power generating apparatus starts. The excitation voltage provider 890 may be structured in the form of a transformer. The amplitude of the excitation voltage may be quite small, for example from 1 volts to 20 volts.

The apparatus is set to operate at a rotation speed equal to or less than the synchronous speed of the alternator in accordance with some embodiments. For example, when the synchronous speed of the alternator is 3600 rpm, the engine (e.g., a gasoline engine) is set to operate at a speed between 3000-3600 rpm in a stable working state. The faster the engine runs, the greater the output power of the engine is. The engine speed of a power generating apparatus will increase up to 3600 rpm as the apparatus picks up its power from an idling state when the apparatus starts to its rated power. When the rotating speed of the engine reaches 3600 rpm, the excitation voltage becomes a DC voltage. Thus, an apparatus will always operate in a sub-synchronous or synchronous state when the apparatus is set to operate at a rotation speed equal to or less than the synchronous speed of the alternator. The synchronous speed of the alternator refers to the rotation rate of the stator's magnetic field. This means that electrical energy in the apparatus always flows from the stator side to the rotor side. No energy flows in the opposite direction. This feature makes it possible to use low cost devices or parts with a uni-directional characteristic such as the uncontrolled bridge rectifier illustrated in FIG. 6A in the apparatus. It should be appreciated that the apparatus may operate at a speed more than the reference speed in undesirable operation conditions. Protection mechanisms such as a circuit breaker may be provided in the apparatus to stop it from operation when the speed is excessive.

Figure 9:
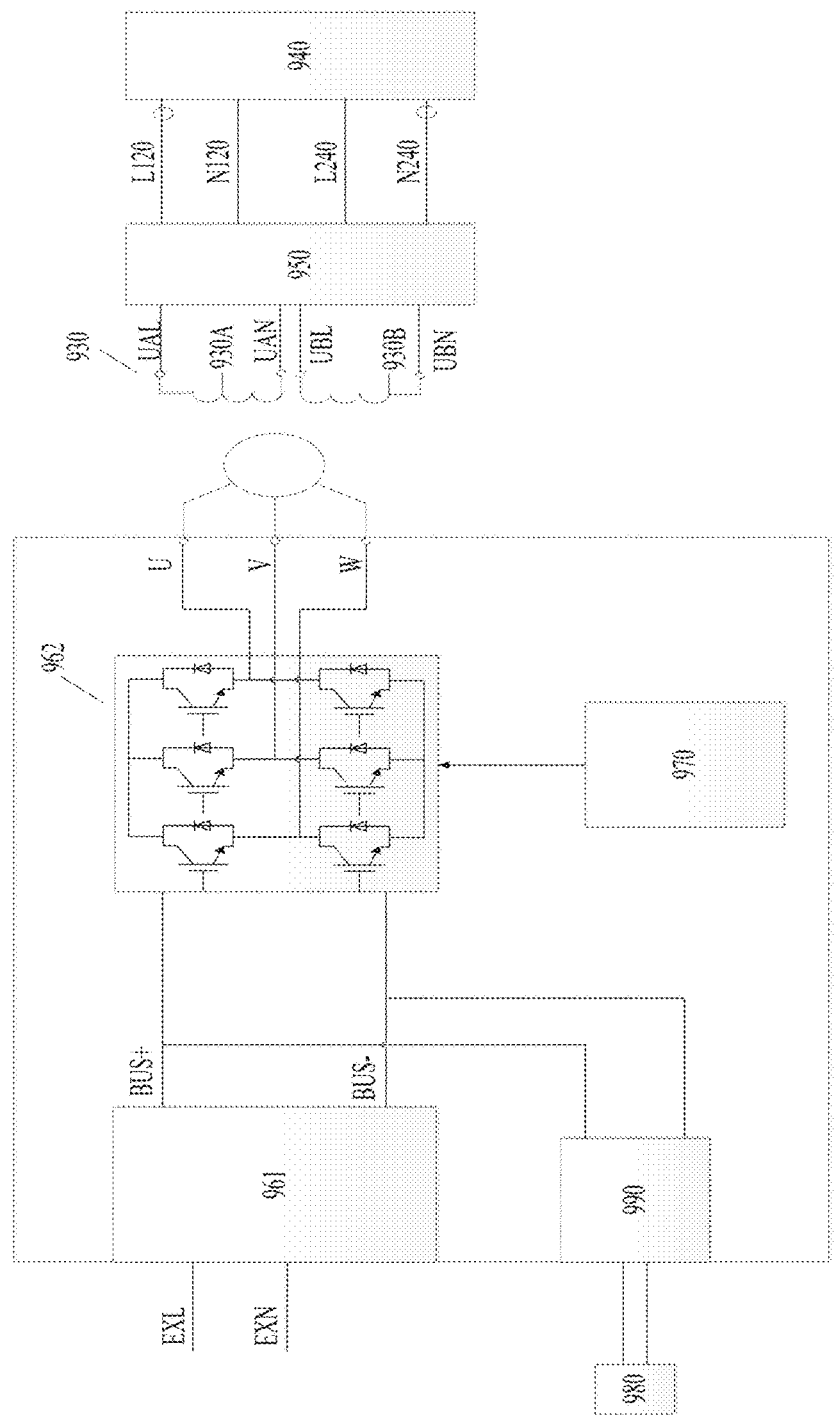
FIG. 9 is a schematic diagram of yet another off-grid power generating apparatus in accordance with some embodiments.

FIG. 9 is a schematic diagram of yet another off-grid power generating apparatus in accordance with some embodiments. The inverter 962 can be two-phase, three-phase, four-phase or five-phase DC/AC inverters corresponding to the number of the symmetric phase windings of the rotor. In FIG. 9, the inverter 962 is illustrated as a three-phase six-switch DC/AC inverter that receives control pulse signals, for example, in the form of a PWM (pulse-width modulation) or SVPWM (Space Vector Pulse Width Modulation) waveform from the excitation control device 970. The control pulse signals are duty ratios of switching-on time in substance. The excitation control device 970 is programmed to provide the pulse signals that are PWM or SVPWM excitation signals with a desired amplitude and frequency. The pulse signals are employed to modulate the amplitude and frequency of the current in the phase windings of the rotor to offset the variation tendency of the amplitude and frequency of the induced voltage generated in the single phase winding of the stator, which is caused by the speed variations of the engine corresponding to load changes. The excitation control device 970 applies the excitation signals to the rotor windings to regulate the intensity of the rotating magnetic field generated in the rotor windings and the rotating speed of the rotating magnetic field relative to the rotor. As a result, the amplitude of the output voltage of the stator, i.e., the output voltage of the apparatus, is kept stable and the frequency of the output voltage is maintained constant. The PWM/SVPWM waveform can be a square wave, modified sine wave and sine wave depending on the circuit design of the inverter 962. Each leg of the inverter 962 may be connected with one phase winding of the rotor through wires. The inverter 962 has one or more switching elements on each leg. The switching elements can be semiconductor switching elements such as IGBT, BJT, MOSFET, GTO, SCR and IGCT. A pair of IGBTs is provided on each leg of the inverter 962 in accordance with some embodiments as illustrated in FIG. 9. The pulse signals from the excitation control device 970 successively control the switch ON and OFF time of the switching elements of the inverter 962 with duty ratios. A relatively stable DC voltage from the DC bus voltage regulator 961 is applied to the inverter 962 as illustrated in FIG. 9. The required input DC voltage of the inverter 962 depends on the design and function of the inverter 962. Factors that can be considered include the amplitude of the induced voltage, the rotating speed range of the engine, the structure of the rotor windings, the current and voltage parameters of IGBT used, etc. The inverter 962 generates PWM or SVPWM excitation signals with desired frequency and amplitude, and the excitation signals are employed to modulate the amplitude and frequency of the current in the phase windings of the rotor so that a rotating magnetic field with the desired intensity and rotating speed relative to the rotor is established. The rated power of the inverter 962 used in the apparatus with a rated power of 7,000 watts is less than 1,500 watts, usually is 700-800 watts. The rated power of an inverter in a power generator with a rated power of 7,000 watts in which an inverter is used to regulate the overall power generated by the generator is usually 7000 watts. Thus, inverters with a much smaller capacity can be used in the apparatus in the embodiments, since the inverter 962 only regulates a fraction of the overall power that is supplied to the rotor for regulating the amplitude and frequency of the output voltage of the apparatus output from the stator side. Accordingly, the inverter 962 is comparatively light and cost-efficient. It is estimated that the cost of the inverter accounts for 20% to 60% of the cost of a traditional power generator. Therefore, the power generating apparatus in the embodiments described above enjoys a superb advantage in terms of costs.

The excitation control device 970 is programmed to regulate the power of the engine, i.e., the speed of the engine. The excitation control device 970 calculates real time load power with the measured operation data from the sensors that are not illustrated in FIG. 9, and regulates speed of the engine in response to the calculated real time load power. The power of the engine is regulated to follow a pre-defined engine power-speed characteristic of the engine to track the maximum power point. The pre-defined engine power-speed characteristic of the engine can be stored in the excitation control device 970.

The alternator may also include a battery 980 in accordance with some embodiments. The battery 980 may be electrically separate from the buses BUS+, BUS− for the sake of safety. The DC voltage of the battery 980 may be applied to the buses BUS+, BUS− through an excitation voltage provider 990 for providing an excitation voltage for establishing a rotating magnetic field in the rotor windings when the power generating apparatus starts. The excitation voltage provider 990 may be structured in the form of a transformer. The amplitude of the excitation voltage may be quite small, for example from 1 volts to 20 volts.

The difference between FIG. 8 and FIG. 9 is that the apparatus in FIG. 9 does not have a separate excitation portion as the apparatus illustrated in FIG. 5. It is easy for those skilled in the art to understand the principle of the apparatus in FIG. 9 thus no more description will be repeated herein.

The power generating apparatus for powering an electrical load is described with reference to FIGS. 1-9 above. The apparatus, as previously described, having a stator with a single phase winding and a rotor with a plurality of symmetric phase windings poses a challenge to conventional control strategies for generators. It is difficult to control an apparatus having a stator with a single phase winding in which an output voltage is generated and output without frequency conversion. A simple and cost-effective control system for the apparatus is provided in this disclosure, which will be described with reference to FIGS. 10-18.

In the control system, an excitation signal is employed to modulate the frequency and amplitude of the current in the rotor windings. Thereby the intensity of the rotating magnetic field and its rotating speed relative to the rotor are modulated. In this manner, the amplitude and frequency of the output voltage are kept stable. Meanwhile, the rotating speed of the engine is variable in response to load changes so that the fuel efficiency of the engine is optimized. This control system enables the power generating apparatus to change its engine speed in a wide range as the load it drives changes.

Figure 11:
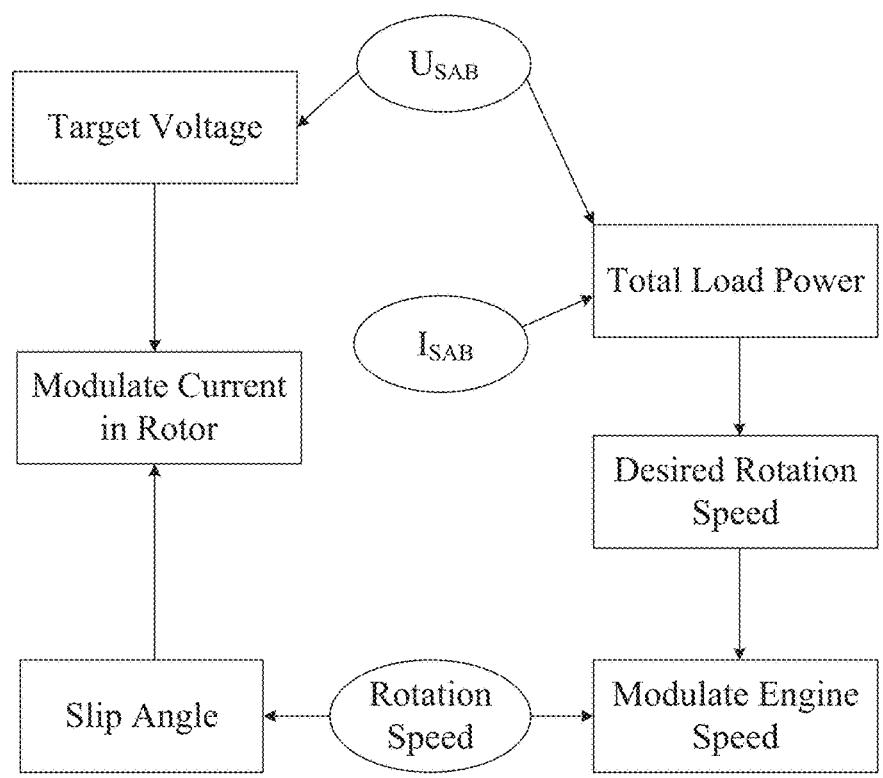
FIG. 11 is a flowchart of a control strategy corresponding to the control system illustrated in FIG. 10.

FIG. 10 illustrates a control system for implementing a control strategy in accordance with some embodiments. FIG. 11 is a flowchart of a control strategy corresponding to the control system illustrated in FIG. 10. The single phase winding of the stator in these embodiments generates an output voltage of one level. The one leveled output voltage may be live to live high voltage of 240 volt $U_{SAB}$ which is provided to the electrical load through live terminal lines A and B to the load (as illustrated in FIG. 10). Another example of the one leveled output voltage is live to neutral 120 volt low voltage which is provided to the electrical load through live terminal line A and neutral terminal line N to the load (not illustrated in FIG. 10). In accordance with some embodiments, the level of the output voltage can be changed by regulating the intensity of the rotating magnetic field. For instance, a low output voltage of 120 volts can be boosted to a high output voltage of 240 volts by increasing the intensity of the rotating magnetic field. It should be understood that the control system illustrated in FIG. 10 and the control strategy illustrated in FIG. 11 are applicable to an apparatus that generates an output voltage of 120 volts from the stator side.

The rotor has three windings U, V, W in a symmetric configuration that are connected with three legs of an inverter 1062 separately. A DC voltage $U_{dc}$ from the DC bus voltage regulator (which is not illustrated FIG. 10) is applied to the inverter 1062 as previously described. A voltage sensor 10V and a current sensor 10A are electrically connected with the terminal lines A and B for measuring the output voltage $U_{SAB}$ and the load current $I_{SAB}$ output by the single phase winding of the stator. Specifically, the amplitude of the output voltage $U_{SAB}$ and the load current $I_{SAB}$ are measured. A speed sensor 10S is connected with the rotor to measure the rotating speed of the rotor. The speed sensor 10S may measure the rotating speed of the engine, since the rotor and the engine are coaxially connected. The amplitudes of the output voltage and the load current and the rotating speed can be real time values measured by the voltage sensor 10V, the current sensor 10A and the speed sensor 10S, for example, real time values measured every millisecond or every second. They can also be the averages or integrals of some real time values measured by the sensors in a period. For example, the sensors measure real time values every second, and the amplitudes of the output voltage and the load current and the rotating speed can be the averages or integrals of the measured real time values in every 10 successive seconds. The measured operation data of the apparatus from the current sensor 10A, voltage sensor 10V and speed sensor 10S may be modulated and filtered and then sent to the excitation control device 1070.

When the excitation control device 1070 collects the measured operation data, load power $P_{load}$ is calculated using equation 1 below:

$$P_{load}=U_{SAB}*I_{SAB} \qquad \text{Equation 1}$$

Where $U_{SAB}$ is the amplitude of the measured output voltage and $I_{SAB}$ is the amplitude of the measured load current. In accordance with some embodiments, a desired rotation speed of the engine can be determined using the pre-defined characteristic curve of the engine. The characteristic curve of the engine is a curve indicating a relationship of operation parameters of the engine, for example, the power, rotation torque and rotation speed of the engine. The characteristic curve can be obtained with experiments and pre-stored in the excitation control device. For a certain load, the excitation control device identifies the corresponding desired rotation speed on the characteristic curve of the engine. In some embodiments, the characteristic curve can also be a table or a formula describing the corresponding relationships between the load and the optimal rotation speed (sometimes with other parameters such as desired voltage as well). When the desired rotation of the engine is available, the excitation control device can correct the rotation speed of the engine by using the desired rotation speed with a closed loop to optimize fuel consumption in response to load changes.

A slip angle $\theta_{slip}$ can be determined using equations 2 and 3 below:

$$\omega_{slip}=\omega_1-\omega_r \qquad \text{Equation 2}$$

$$\theta_{slip}=\int\omega_{slip} \qquad \text{Equation 3}$$

Where $\omega_r$ is the rotation speed of the rotor, and $\omega_1$ is the synchronous speed of the alternator.

In the control strategy illustrated in FIG. 11, a voltage sensor and a current sensor respectively measure the output voltage $U_{SAB}$ and the load current $I_{SAB}$ output by the single phase winding of the stator. A speed sensor measures the rotation speed of the rotor. The excitation control device calculates the load power with the equation of $P_{load}=U_{SAB}*I_{SAB}$, and determines the desired engine speed according to the load power $P_{load}$. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* at least according to the measured amplitude of the output voltage. Then the excitation control device generates a modulating signal according to the target voltage of the rotor Urq* and the slip angle and modulates the frequency and the amplitude of the current in the phase windings of the rotor with the modulating signal. It should be noted that the control strategy illustrated in FIG. 11 is also applicable to an apparatus that outputs a live to neutral voltage from the stator side.

Figure 12:
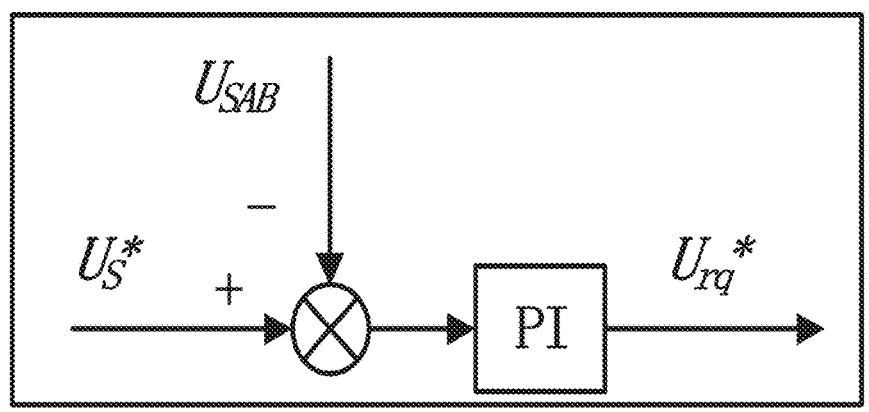
FIG. 12 is schematic diagram of a control loop of the stator voltage in accordance with some embodiments.

FIG. 12 is schematic diagram of a control loop of the stator voltage in accordance with some embodiments. A closed control loop is used to automatically correct the amplitude of the target voltage of the rotor so that the amplitude of the output voltage is kept constant. A Proportional-Integral (PI) regulator is provided in the closed control loop to reduce errors of the target voltage of the rotor. The output voltage $U_{SAB}$, which is a negative feedback, and the target voltage of the stator $U_s$* work as inputs of the PI regulator. The output of the PI regulator is the target voltage of the rotor $U_{rq}$*. The obtained slip angle $\theta_{slip}$ and target voltage of the rotor $U_{rq}$* are used by the excitation control device to generate a pulse signal with a certain duty ratio, which is input into the inverter as illustrated in FIG. 10 to regulate the switch ON and OFF time of the switching elements of the inverter. The inverter regulates the amplitude and frequency of the current in the rotor windings. Thereby the intensity of the rotating magnetic field established in the rotor windings and the rotating speed of the rotating magnetic field relative to the rotor are regulated so that the amplitude and frequency of the induced voltage generated in the stator winding are kept constant.

Figure 14A:
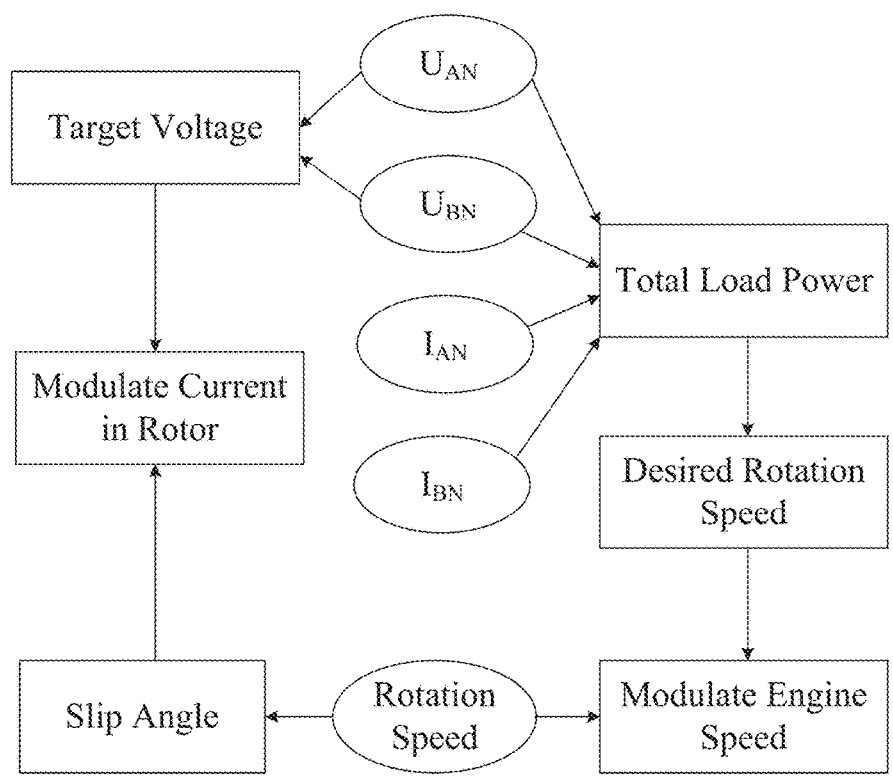
FIGS. 14A and 14B are flowcharts of another control strategy corresponding to the control system in FIG. 13.
Figure 14B:
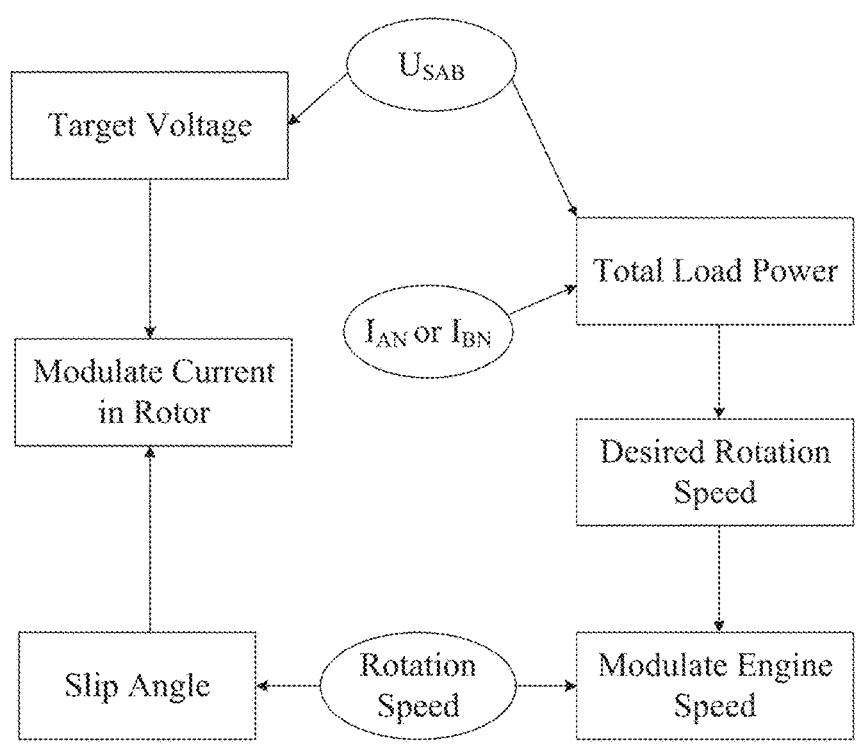
Figure 15:
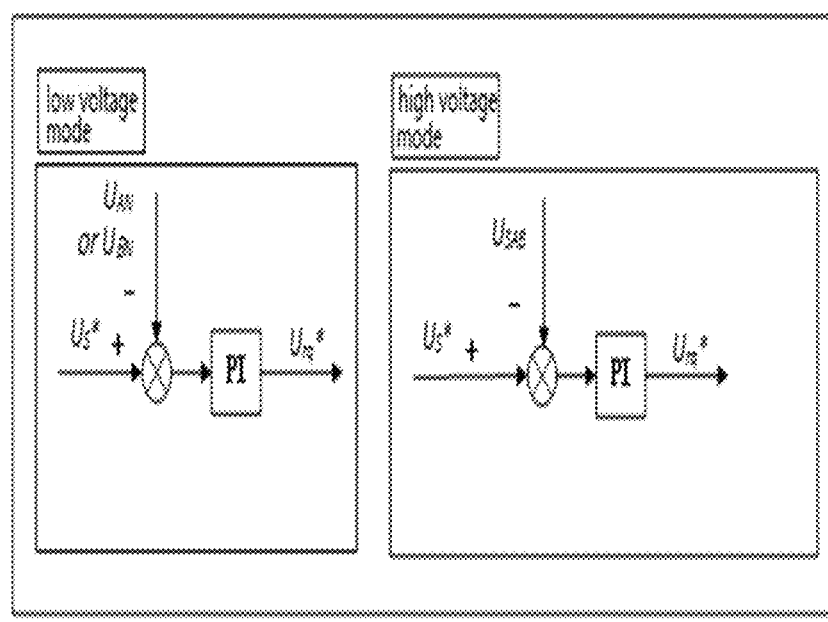
FIG. 15 is schematic diagram of a control loop of the stator voltage in accordance with some embodiments.

FIG. 13 illustrates another control system for implementing another control strategy in accordance with some embodiments. FIG. 14 is a flowchart of another control strategy corresponding to the control system in FIG. 13. FIG. 15 is schematic diagram of a control loop of the stator voltage in accordance with some embodiments. The differences between this control system and the previous one illustrated in FIGS. 10-12 are as follows.

As illustrated in FIG. 13, the single phase winding of the stator outputs to the electrical load a dual output voltage, i.e., a high voltage and a low voltage, through live terminal lines A, B and neutral terminal line N. The high voltage is live to live voltage $Us_{AB}$, and the low voltage is live to neutral voltage $U_{AN}$ and $U_{BN}$. A user can switch over the switch as described previously to select the high voltage or the low voltage. The switching over signal can be delivered to the excitation device 1370 via a signal line or wireless communications devices such as WIFI devices. The excitation device 1370 selects the high voltage or the low voltage responsive to the switching over signal it receives. A first current sensor 13A1 and a second current sensor 13A2 are provided to measure the first live to neutral current $I_{BN}$ and the second live to neutral current $I_{AN}$. Likewise, a first voltage sensor 13V1 and a second voltage sensor 13V2 are provided to measure the first live to neutral voltage $U_{BN}$ and the second live to neutral voltage $U_{AN}$. Additionally, a third voltage sensor 13V3 is provided to measure the high voltage $U_{SAB}$.

When the apparatus operates in the low voltage mode, the first and the second live to neutral load powers $P_{load\ AN}$, $P_{load\ BN}$ are calculated using equations 4 and 5 below:

$$P_{load\ AN} = U_{AN} * I_{AN} \qquad \text{Equation 4}$$

$$P_{load\ BN} = U_{BN} * I_{BN} \qquad \text{Equation 5}$$

Where $U_{AN}$ and $U_{BN}$ are the amplitudes of the measured live to neutral output voltages, and $I_{AN}$ and $I_{BN}$ are the amplitude of the measured load current. Then the total power $P_{load\ total}$ is calculated with equation 6 below:

$$P_{load\ total} = P_{load\ AN} + P_{load\ BN} \qquad \text{Equation 6}$$

Where $P_{load\ AN}$ and $P_{load\ BN}$ are the first and second live to neutral load powers. The excitation device then determines the desired engine speed in accordance with the total power $P_{load\ total}$.

When the apparatus operates in the high voltage mode, a load power $P_{load}$ is calculated using equation 7 below:

$$P_{load} = U_{SAB} * I_{AN} \qquad \text{Equation 7}$$

Where $U_{SAB}$ is the amplitude of the measured output voltage and $I_{AN}$ is the amplitude of the measured load current. $I_{BN}$ can be used to replace $I_{AN}$ in equation 7 since $I_{AN}$ and $I_{BN}$ are equal in the high voltage mode. The excitation device then determines the desired engine speed in accordance with the load power $P_{load}$.

In accordance with some embodiments, the control strategy distinguishes the working mode of the system. The system may operate in a high voltage mode and a low voltage mode. FIG. 14A and FIG. 14B respectively illustrate the flowcharts of the low voltage mode and the high voltage mode. The excitation control device receives a working mode signal from the switch. The working mode signal indicates whether the apparatus is working on the high voltage mode or low voltage mode. One or more voltage sensors measure the amplitudes of the low voltage $U_{AN}$ and $U_{BN}$, the high voltage $U_{SAB}$, One or more current sensors measure the live to neutral currents $I_{AN}$ and $I_{BN}$. A speed sensor measures the rotation speed of the rotor. In the low voltage mode as illustrated in FIG. 14A, the excitation control device calculates the total load power with the equation of $P_{load\ total} = U_{AN}*I_{AN} + U_{BN}*I_{BN}$, and determines the desired engine speed according to the total load power $P_{load\ total}$. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor $U_{rq}^*$ according to the amplitude of the measured low voltage $U_{AN}$ or $U_{BN}$. Then the excitation control device generates a modulating signal according to the target voltage of the rotor $U_{rq}^*$ and the slip angle $\theta_{slip}$, and uses the modulating signal to modulate the frequency and the amplitude of the current in the phase windings of the rotor. FIG. 14B illustrates the flowchart of the high voltage mode. The excitation control device calculates the load power with the equation of $P_{load} = U_{SAB}*I_{AN}$. In some embodiments, $I_{BN}$ can be used to replace $I_{AN}$ since $I_{AN}$ and $I_{BN}$ are equal in the high voltage mode. Then the excitation control device obtains the desired engine speed according to the load power $P_{load}$. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor $U_{rq}^*$ according to the amplitude of the measured high voltage $U_{SAB}$. Then the excitation control device generates a modulating signal according to the target voltage of the rotor $U_{rq}^*$ and the slip angle $\theta_{slip}$. The excitation control device uses the modulating signal to modulate the frequency and the amplitude of the current in the phase windings of the rotor.

FIG. 15 is schematic diagram of a control loop of the stator voltage in accordance with some embodiments. This control loop switches between two modes, a high voltage mode and a low voltage mode. In the high voltage mode, the high output voltage $U_{SAB}$ is set as a negative feedback input to the PI regulator. The target voltage of the stator $U_s^*$ serves to correct the high voltage $U_{SAB}$ in the PI regulator. The output of the PI regulator is the target voltage of the rotor $U_{rq}^*$. In the low voltage mode, the low output voltage $U_{AN}$ or $U_{BN}$ is set as a negative feedback input to the PI regulator. The target voltage of the stator $U_s^*$ serves to correct the low output voltage $U_{SAB}$ in the PI regulator. The output of the PI regulator is also the target voltage of the rotor $U_{rq}^*$ in the low voltage mode. The obtained slip angle and target voltage of the rotor are then used by the excitation control device to generate a pulse signal. Other features in this control system are similar to those described previously with reference to FIGS. 10-12, and therefore will not be discussed again herein.

Figure 17:
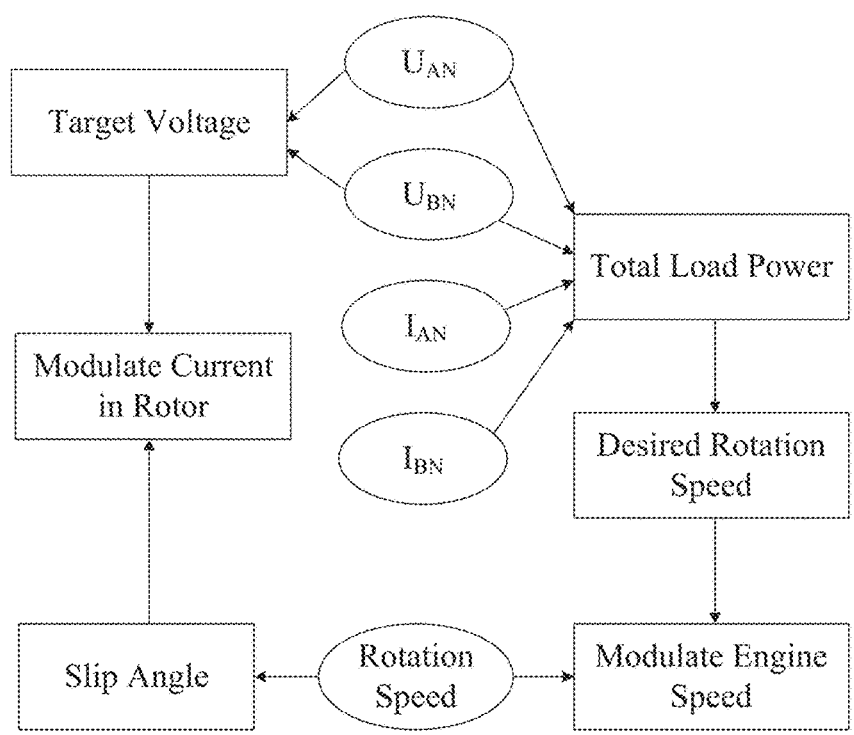
FIG. 17 is a flowchart of another control strategy corresponding to the control system in FIG. 16.
Figure 18:
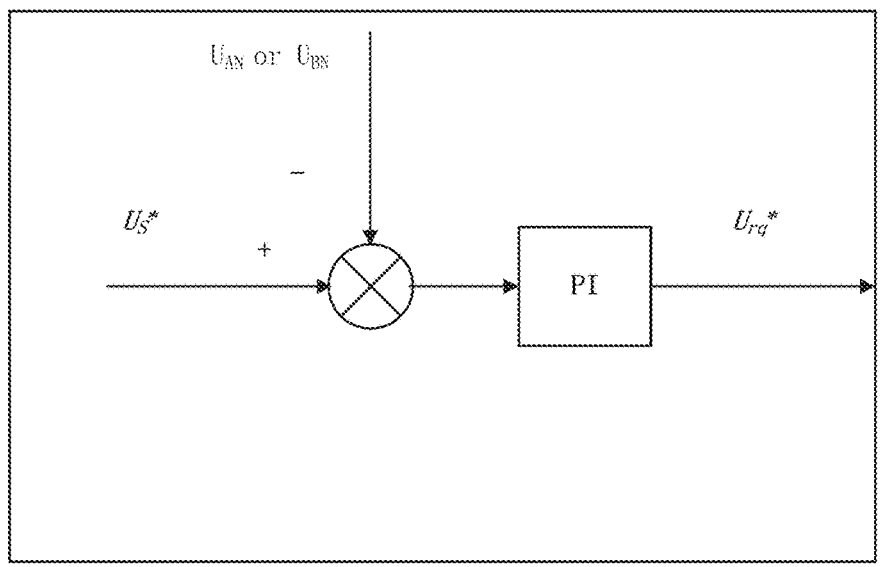
FIG. 18 is schematic diagram of a control loop of the stator voltage in accordance with some embodiments.

FIG. 16 illustrates another control system for an off-grid power generating apparatus in accordance with some embodiments. FIG. 17 is a flowchart of a control strategy corresponding to the control system illustrated in FIG. 16 in accordance with some embodiments. FIG. 18 is schematic diagram of a control loop of the stator voltage in accordance with some embodiments. As illustrated in FIG. 16, the stator winding delivers to the load a live to live voltage $U_{SAB}$ (i.e., the high voltage) via live line A and B, and a live to neutral voltage $U_{AN}$ or $U_{BN}$ (i.e., low voltage) via live line A or B and neutral line N. A user can switch over the switch to select the high voltage or the low voltage. Unlike the embodiments illustrated in FIGS. 13-15, the excitation control device 1670 employs the same control strategy in these embodiments, no matter whether the apparatus operates in the high voltage mode or the low voltage mode. Thus, switching signals from the switch are not needed for monitoring the apparatus in these embodiments.

A first current sensor 16A1 and a second current sensor 16A2 are provided to measure the first live to neutral current $I_{BN}$ and the second live to neutral current $I_{AN}$. Likewise, a first voltage sensor 16V1 and a second voltage sensor 16V2 are provided to measure the first live to neutral voltage $U_{BN}$ and the second live to neutral voltage $U_{AN}$. The live to live voltage (i.e., the high voltage) is not needed for implementing the control strategy in these embodiments.

In accordance with some embodiments, no matter whether the apparatus operates in the high voltage mode or the low voltage mode, the load power of the apparatus is calculated with equation 8 below:

$$P_{load\ total} = U_{AN} * I_{AN} + U_{BN} * I_{BN} \quad \text{Equation 8}$$

Where $U_{AN}$ and $U_{BN}$ are the first live to neutral voltage and the second live to neutral voltage, and $I_{AN}$ and $I_{BN}$ are the first live to neutral current and the second live to neutral current. The excitation device then determines the desired engine speed in accordance with the load power $P_{load\ total}$.

In accordance with some embodiments, the voltage sensor and the current sensor measure the amplitudes of the live to neutral output voltage $U_{AN}$ and $U_{BN}$ and the load currents $I_{AN}$ and $I_{BN}$ in the control strategy illustrated in FIG. 17. The speed sensor measures the rotation speed of the rotor. Then the excitation control device calculates the total load power $P_{load\ total} = U_{AN} * I_{AN} + U_{BN} * I_{BN}$, and obtains the desired speed of the engine according to the total load power. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* at least according to the measured amplitude of the Live to neutral output voltage $U_{AN}$ or $U_{BN}$. Then the excitation control device generates a modulating signal according to the target voltage of the rotor Urq* and the slip angle $\theta_{slip}$, and modulates the frequency and the amplitude of the current in the phase windings of the rotor with the modulating signal.

FIG. 18 is schematic diagram of a control loop of the stator voltage in accordance with some embodiments. Unlike the embodiments illustrated in FIGS. 13-15, the control loop of the stator voltage in the embodiments does not switch over between the high voltage mode and the low voltage mode. Rather, the control loop of the stator voltage just employs the live to neutral voltage $U_{AN}$ or $U_{BN}$ as a negative feedback input to the PI regulator. The target voltage of the stator $U_s^*$ serves as another input of the PI regulator to correct the live to neutral voltage $U_{AN}$ or $U_{BN}$. The output of the PI regulator is the target voltage of the rotor $U_{rq}^*$. The obtained slip angle and target voltage of the rotor are used by the excitation control device to generate a pulse signal with a certain duty ratio, which is input into the inverter 1662 illustrated in FIG. 16 to regulate the switch ON and OFF time of the switching elements of the inverter. The inverter 1662 regulates the amplitude and frequency of the current in the rotor windings. Thereby the intensity of the rotating magnetic field established in the rotor windings and the rotating speed of the rotating magnetic field relative to the rotor are regulated so that the amplitude and frequency of the induced voltage generated in the stator winding are regulated accordingly. Only the live to neutral voltage of the stator is monitored in the embodiments illustrated in FIGS. 16-18 and the excitation control device does not need to communicate with the switch to obtain its operating mode.

It should be noted that the operations illustrated in FIGS. 11, 14 and 17 can be implemented in an order different from the order illustrated in these figures. Some operations can be conducted substantially simultaneously or in a reverse order, depending on the functions achieved by the operations. For example, determining the target voltage of the rotor can be conducted after or at the same time as the step of measuring the rotating speed of the rotor is implemented.

A meter for measuring the angular position of the rotor such as an encoder, which is typically expensive, is not used in the control system in accordance with some embodiments. Further, a current control loop, which is usually involved in vector control methods, is not used in the system. The control system is therefore simple and easy to implement. As a result, an excitation control device with a low capability can be used in the apparatus.

Figure 19:
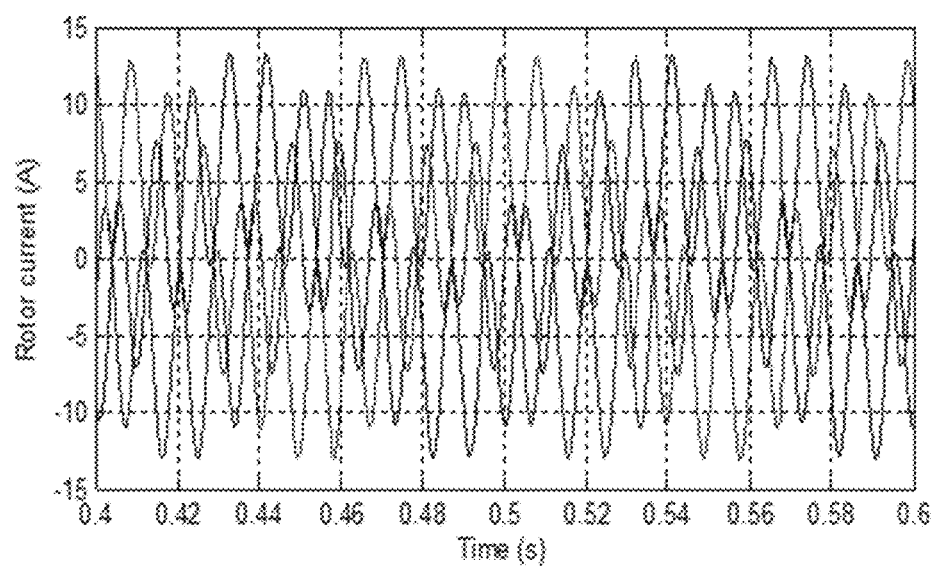
FIG. 19 illustrates a waveform of an excitation current of the rotor in accordance with some embodiments.
Figure 20:
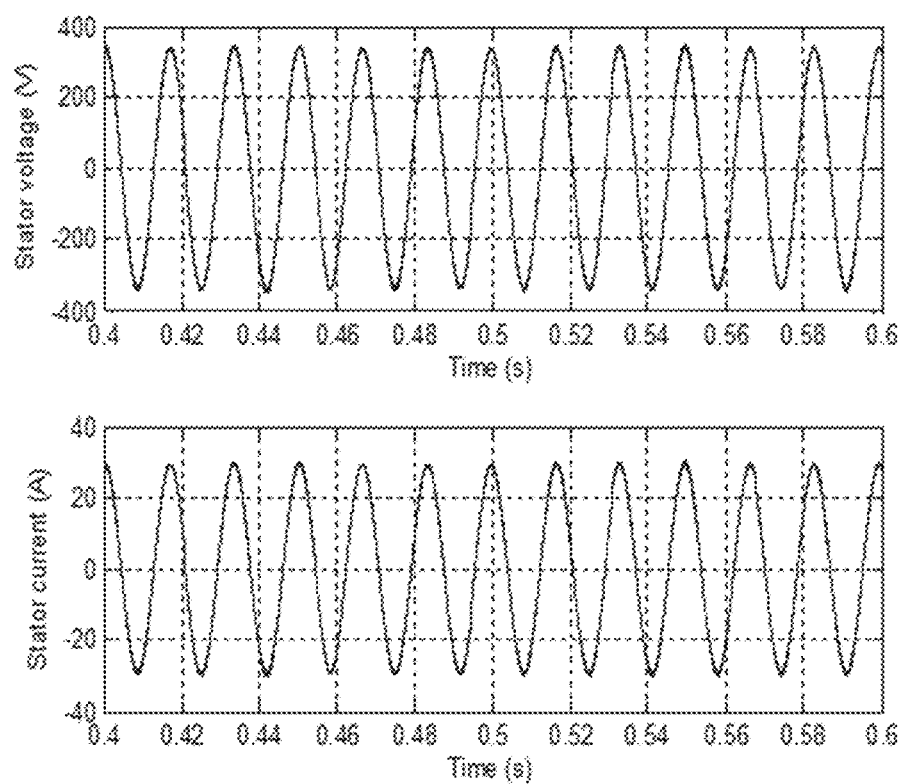
FIG. 20 illustrates a waveform of a current and a waveform of a voltage output by the apparatus in accordance with some embodiments.

FIG. 19 illustrates a waveform of an excitation current for establishing a magnetic field in the rotor windings in accordance with some embodiments. This waveform is achieved by an apparatus with a single phase stator winding and three phase rotor windings which operates at 3000 rpm and outputs 240 volt voltage from the stator side and is applied with a resistive load of 5 kW (kilowatt). FIG. 20 illustrates a waveform of a current and a waveform of a voltage output from the stator side of the apparatus in accordance with some embodiments. The waveforms are achieved by an apparatus having a stator with a single phase winding. The apparatus that is applied with a resistive load of 5 kW operates at a speed of 3000 rpm, and outputs an output voltage of 240 volt from the stator side. FIGS. 19 and 20 clearly indicate that the control system yields satisfactory waveforms.

The various embodiments disclosed above have many advantages. The apparatus has a stator with a single winding and a rotor with a plurality of symmetric windings. The combination of a stator with a single winding and a rotor with a plurality of symmetric phase windings enables the apparatus to power single phase electrical devices with small rated powers such as household appliances while keeping the control of the apparatus simple and easy.

A meter for measuring the angular position of the rotor such as an encoder, which is typically expensive, is not used in the control system in accordance with some embodiments. Further, a current control loop, which is usually involved in vector control methods, is not used in the system. The control system is therefore simple and easy to implement. As a result, an excitation control device with a low capability can be used in the apparatus.

The power generating apparatus outputs electrical power directly from the stator without any frequency conversion in accordance with some embodiments. Unlike a generator with an AC-DC-AC converter regulating the full power (overall power) of the generator, the apparatus merely modulates a fraction of its full power with an inverter. The inverter modulates the amplitude and frequency of the current in the rotor windings to compensate for variations of the induced voltage that is generated in the stator winding. In this manner, the amplitude and frequency of the output voltage from the stator, i.e., the output voltage of the apparatus, are kept stable. It is estimated that the rated power of a power converter disposed on the rotor side of a power generating apparatus accounts for merely around 10% of the rated output power of the power generating apparatus. Thus, an inverter with a lower rated capacity can be used in the apparatus.

The inverter applies an AC voltage to the phase windings of the rotor as an excitation voltage for establishing the rotating magnetic field in the rotor. Both the amplitude of the excitation voltage and its frequency are controllable. This is advantageous given that only the amplitude of the excitation voltage is controllable when a DC voltage is used as the excitation voltage.

The operation speed of the engine in the apparatus is desirably adjustable to maximize fuel efficiency, and thus reduces $CO_2$ emissions of the engine for a given load. Optimizing the operating speed of the engine corresponding to a given load also reduces the noise associated with operation of the engine-driven apparatus and extends the life of the engine. The output voltage from the stator is substantially kept at a constant frequency.

The amplitude of the output voltage provided by the apparatus is stable given that a closed voltage loop is employed to determine the target rotor voltage for regulating the intensity of the rotating magnetic field. With this feature, the apparatus can be utilized to power electrical devices such as audio and video players and some scientific instruments that are sensitive to voltage and frequency instability. Furthermore, the apparatus can provide an output voltage at dual levels with a single phase winding so that users can use the apparatus to power electrical devices with different nominal voltages.

The apparatus is set to operate at a speed equal to or less than the synchronous speed of the alternator, which means that electrical energy flows uni-directionally, i.e., from the stator to the rotor, not vice visa. This feature renders cheap devices such as uncontrolled bridge rectifier applicable to the apparatus. The feature also makes it possible to control the apparatus with a simple and easy control strategy. Devices with a comparatively low capability can also be used in the apparatus.

The above is only the preferred embodiments of the application and not intended to limit the application, and any modifications, equivalent replacements, improvements and the like within the spirit and principle of the application shall fall within the scope of protection of the application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An off-grid power generating apparatus for powering an electrical load, comprising:
    an engine;
    an alternator including:
        a rotor coaxially coupled to the engine, the rotor including a plurality of symmetric phase windings;
        a stator with a single phase winding configured to generate an induced voltage, the single phase winding being configured to be connected with the electrical load and the phase windings of the rotor respectively and supply an output voltage to the electrical load and an excitation voltage to the phase windings of the rotor;
        a voltage sensor configured to measure an amplitude of the output voltage;
        a current sensor configured to measure an amplitude of an alternating current applied to the electrical load; and
        a speed sensor configured to measure a rotation speed of the rotor or the engine; and
    an excitation control device operatively connected to the engine and the alternator, wherein the excitation control device is configured to control the induced voltage generated in the single phase winding of the stator by regulating the rotating magnetic field generated in the phase windings of the rotor; the excitation control device includes:
        a first calculating element configured to calculate a load power of the electrical load at least in accordance with the measured amplitudes of the output voltage and the alternating current, and determine a desired rotation speed of the engine at least in accordance with the calculated load power;
        a first modulating element configured to modulate the speed of the engine at least in accordance with the desired rotation speed of the engine;
        a second calculating element configured to determine a slip angle at least in accordance with the rotation speed of the rotor or the engine measured by the speed sensor; and
        a third calculating element configured to determine a target voltage of the rotor at least in accordance with the amplitude of the output voltage measured by the voltage sensor; and
        a second modulating element configured to generate a modulating signal at least in accordance with the target voltage of the rotor and the slip angle, and modulate a frequency and an amplitude of an excitation current in the phase windings of the rotor with the modulating signal.

2. The apparatus of claim 1, the alternator comprising a frequency conversion device connected with the single phase winding of the stator, wherein the frequency conversion device includes an inverter that provides the excitation voltage to the phase windings of the rotor.

3. The apparatus of claim 1, wherein the alternator includes a switch operatively connected with the electrical load and being movable from a first position to a second position by a user, the single phase winding of the stator includes a first segment and a second segment each of which has at least one coil that are operatively and separately connected with the switch, the first segment and the second segment are configured to be in series connection at the first position of the switch to provide a high output voltage to the electrical load via the switch and in parallel connection at the second position of the switch to provide a low output voltage to the electrical load via the switch, wherein:

the voltage sensor is configured to measure the amplitudes of a first and a second output voltage provided by the first and the second segment to the electrical load; and the current sensor is configured to measure the amplitudes of a first and a second alternating current applied respectively by the first and the second segment to the electrical load.

4. The apparatus of claim 1, wherein the alternator includes a switch operatively connected with the electrical load and being movable from a first position to a second position by a user, the single phase winding of the stator includes a first segment and a second segment each of which has at least one coil that are operatively and separately connected with the switch, the first segment and the second segment are configured to be in series connection at the first position of the switch and in parallel at the second position of the switch to provide a high output voltage and a low output voltage respectively to the electrical load via the switch.

5. The apparatus of claim 1, wherein the third calculating element is configured to determine the target voltage of the rotor with a closed control loop.

6. The apparatus of claim 1, the alternator comprising an electrical circuit connecting the single phase winding of the stator and the electrical load, wherein the electrical circuit s configured in a way that the induced voltage generated in the single phase winding of the stator and the output voltage applied to the electrical load are at the same frequency.

7. A control method of an off-grid power generating apparatus for powering an electrical load, the apparatus including an engine and an alternator that includes a stator with a single phase winding configured to generate an induced voltage and a rotor with a plurality of symmetric phase windings, wherein the rotor is coaxially coupled to the engine, and the single phase winding of the stator is configured to be connected to the electrical load and the phase windings of the rotor respectively and provide an output voltage to the electrical load and an excitation voltage to the phase windings of the rotor, the method comprising:

measuring an amplitude of the output voltage provided to the electrical load;

measuring an amplitude of an alternating current provided to the electrical load;

measuring a rotation speed of the rotor or the engine;

calculating a load power of the electrical load at least in accordance with the measured amplitudes of the output voltage and the alternating current;

determining a desired rotation speed of the engine at least in accordance with the calculated load power;

modulating the speed of the engine at least in accordance with the desired rotation speed of the engine;

determining a slip angle at least in accordance with the measured rotation speed of the rotor or the engine and the synchronous speed of the alternator;

determining a target voltage of the rotor at least in accordance with the amplitude of the measured output voltage;

generating a modulating signal at least in accordance with the target voltage of the rotor and the slip angle; and modulating a frequency and an amplitude of an excitation current in the phase windings of the rotor with the modulating signal.

8. The method of claim 7, the alternator comprising a frequency conversion device connected to the single phase winding of the stator, wherein the frequency conversion device includes an inverter that provides the excitation voltage to the phase windings of the rotor.

9. The method of claim 7, wherein the single phase winding of the stator includes a first segment and a second segment, measuring an amplitude of the output voltage includes measuring the amplitudes of a first and a second output voltage provided by the first and the second segment to the electrical load;

measuring an amplitude of an alternating current includes measuring the amplitudes of a first and a second alternating current applied respectively by the first and the second segment to the electrical load;

calculating a load power of the electrical load includes calculating a first and a second load power of the electrical load at least in accordance with the measured amplitudes of the first output voltage and the first alternating current, and the second output voltage and the second alternating current, and a total load power by adding the first and the second load power, and determining a desired rotation speed of the engine at least in accordance with the calculated load power includes determining the desired rotation speed of the engine at least in accordance with the total load power; and determining a target voltage of the rotor includes determining the target voltage of the rotor at least in accordance with the amplitude of the first or the second output voltage.

10. The method of claim 7, wherein the single phase winding of the stator includes a first segment and a second segment, measuring the amplitude of the output voltage includes measuring the amplitudes of a first and a second output voltage provided by the first segment and the second segment to the electrical load, and a total output voltage when the first segment and the second segment are in series connection;

measuring the amplitude of an alternating current includes measuring the amplitudes of a first and a second alternating current applied respectively by the first and the second segment to the electrical load;

when the first segment and the second segment are in series connection to provide the high output voltage, calculating a load power of the electrical load includes calculating a total load power at least in accordance with the measured amplitudes of the total output voltage and either of the first alternating current and second alternating current;

determining a desired rotation speed of the engine includes determining the desired rotation speed of the engine at least in accordance with the total load power; and determining a target voltage of the rotor includes determining the target voltage of the rotor at least in accordance with the amplitude of the measured total output voltage.

11. The method of claim 7, wherein the single phase winding of the stator includes a first segment and a second segment, measuring the amplitude of the output voltage includes measuring the amplitudes of a first and a second output voltage provided by the first segment and the second segment to the electrical load, and a total output voltage when the first segment and the second segment are in series connection;

measuring the amplitude of an alternating current includes measuring the amplitudes of a first and a second alternating current applied respectively by the first and the second segment to the electrical load; and when the first segment and the second segment are in parallel connection at the second position of the switch to provide the low output voltage, calculating a load power of the electrical load includes calculating a first and a second load power of the electrical load at least in accordance with the measured amplitudes of the first output voltage, the first alternating current, the second output voltage and the second alternating current, and a total load power by adding the first and the second load power; determining a desire rotation speed of the engine includes determining the desired rotation speed of the engine at least in accordance with the total load power; and determining a target voltage of the rotor includes determining the target voltage of the rotor at least in accordance with the amplitude of the first or the second output voltage.

12. The method of claim 7, wherein the induced voltage generated in the single phase winding of the stator and the output voltage applied to the electrical load are at the same frequency.

13. The method of claim 7, wherein the alternator is set to operate at a speed equal to or less than a synchronous speed of the alternator.

14. An off-grid portable generator set for powering an electrical load, comprising:
an engine;
an induction alternator including:
a rotor coaxially coupled to the engine, the rotor including a plurality of symmetric phase windings;
a stator with a single phase winding configured to generate an induced voltage, the single phase winding being configured to be connected with the electrical load and the phase windings of the rotor respectively and provide an output voltage to the electrical load and an excitation voltage to the phase windings of the rotor;
a voltage sensor configured to measure an amplitude of the output voltage;
a current sensor configured to measure an amplitude of an alternating current applied by the single phase winding to the electrical load; and
a speed sensor configured to measure a rotation speed of the rotor or the engine; and
an excitation control device operatively connected to the engine and the alternator, wherein the excitation control device is configured to control the induced voltage generated in the single phase winding of the stator by regulating the rotating magnetic field generated in the phase windings of the rotor; the excitation control device includes:
a first calculating element configured to calculate a load power of the electrical load at least in accordance with the measured amplitudes of the output voltage and the alternating current, and determine a desired rotation speed of the engine at least in accordance with the calculated load power;
a first modulating element configured to modulate the speed of the engine at least in accordance with the desired rotation speed of the engine;
a second calculating element configured to determine a slip angle at least in accordance with the rotation speed of the rotor or the engine measured by the speed sensor;

a third calculating element configured to determine a target voltage of the rotor at least in accordance with the amplitude of the output voltage measured by the voltage sensor; and
a second modulating element configured to generate a modulating signal at least in accordance with the target voltage of the rotor and the slip angle, and modulate a frequency and an amplitude of an excitation current in the phase windings of the rotor with the modulating signal.

15. The generator set of claim 14, the alternator comprising a frequency conversion device connected with the single phase winding of the stator, wherein the frequency conversion device includes an inverter that provides the excitation voltage to the phase windings of the rotor.

16. The generator set of claim 14, wherein the alternator includes a switch operatively connected with the electrical load and being movable from a first position to a second position by a user, the single phase winding of the stator includes a first segment and a second segment each of which has at least one coil that are operatively and separately connected with the switch, the first segment and the second segment are configured to be in series connection at the first position of the switch and in parallel connection at the second position of the switch to provide a high output voltage and a low output voltage respectively to the electrical load via the switch.

17. The generator set of claim 14, wherein the single phase winding of the stator includes a first segment and a second segment,
the voltage sensor is configured to measure the amplitudes of a first and a second output voltage provided by the first segment and the second segment to the electrical load, and a total output voltage when the first segment and the second segment are in series connection; and
the current sensor is configured to measure the amplitudes of a first and a second alternating current applied respectively by the first and the second segment to the electrical load.

18. The generator set of claim 17, wherein:
the first calculating element is configured, when the first segment and the second segment are in series connection to provide the high output voltage, to calculate a total load power at least in accordance with the measured amplitudes of the total output voltage and either of the first alternating current and second alternating current, and to determine the desired rotation speed of the engine at least in accordance with the total load power; the first calculating element is also configured, when the first segment and the second segment are in parallel connection to provide the low output voltage, to calculate a first and a second load power of the electrical load at least in accordance with the measured amplitudes of the first output voltage and the first alternating current, and the second output voltage and the second alternating current, and a total load power by adding the first and the second load power, and to determine the desired rotation speed of the engine at least in accordance with the total load power; and
the third calculating element is configured, when the first segment and the second segment are in series connection to provide the high output voltage, to determine a target voltage of the rotor at least in accordance with the amplitude of the total output voltage; and the third calculating element is also configured, when the first segment and the second segment are in parallel connection to provide the low output voltage, to determine a target voltage of the rotor at least in accordance with the amplitude of the first or the second output voltage.

19. The generator set of claim 14, the alternator comprising an electrical circuit connecting the single phase winding of the stator and the electrical load, wherein the electrical circuit s configured in a way that the induced voltage generated in the single phase winding of the stator and the output voltage applied to the electrical load are at the same frequency.

20. The generator set of claim 14, wherein the alternator is set to operate at a speed equal to or less than a synchronous speed of the alternator.

\* \* \* \* \*